US011946772B2

(12) United States Patent
Kollmitzer

(10) Patent No.: US 11,946,772 B2
(45) Date of Patent: Apr. 2, 2024

(54) DEVICE AND METHOD FOR DETERMINING THE TRANSFER FUNCTION OF AN ANGLE SENSOR

(71) Applicant: Infineon Technologies AG, Neubiberg (DE)

(72) Inventor: Benjamin Kollmitzer, Pörtschach (AT)

(73) Assignee: Infineon Technologies AG, Neubiberg (DE)

(*) Notice: Subject to any disclaimer, the term of this patent is extended or adjusted under 35 U.S.C. 154(b) by 615 days.

(21) Appl. No.: 16/949,012

(22) Filed: Oct. 9, 2020

(65) Prior Publication Data

US 2021/0116264 A1 Apr. 22, 2021

(30) Foreign Application Priority Data

Oct. 16, 2019 (DE) .......................... 102019215949.4

(51) Int. Cl.
*G01B 7/30* (2006.01)
*G01D 5/244* (2006.01)
*G01D 18/00* (2006.01)

(52) U.S. Cl.
CPC ............. *G01D 18/001* (2021.05); *G01B 7/30* (2013.01); *G01D 5/2449* (2013.01)

(58) Field of Classification Search
CPC .. G01D 18/001; G01D 18/004; G01D 18/006; G01D 18/008; G01D 5/2449; G01D 5/2448; G01B 7/30
USPC ......................................................... 702/104
See application file for complete search history.

(56) References Cited

U.S. PATENT DOCUMENTS

| 2006/0290545 A1* | 12/2006 | Granig .................... H03M 1/06 341/118 |
| 2009/0309532 A1* | 12/2009 | Ueda ...................... B23K 26/21 318/600 |
| 2014/0316733 A1* | 10/2014 | Mori ........................ G01D 5/00 702/94 |
| 2015/0362348 A1 | 12/2015 | Moy |
| 2017/0030742 A1* | 2/2017 | Mochizuki ......... G01D 5/24476 |
| 2017/0276740 A1 | 9/2017 | Schmitt et al. |
| 2018/0164131 A1* | 6/2018 | Hammerschmidt ... G01D 5/145 |
| 2018/0252511 A1* | 9/2018 | Furukawa ................. H02P 6/10 |
| 2019/0113592 A1 | 4/2019 | Rigoni et al. |
| 2020/0370924 A1* | 11/2020 | Bilbao De Mendizabal ............... G01D 18/008 |
| 2021/0285802 A1* | 9/2021 | Loeken .................. G01D 18/00 |

FOREIGN PATENT DOCUMENTS

| DE | 102004024398 A1 | 12/2005 |
| DE | 102005024879 B4 | 12/2018 |
| JP | 2018151180 A | 9/2018 |
| KR | 100478978 B1 | 3/2005 |

* cited by examiner

*Primary Examiner* — Mohamed Charioui
*Assistant Examiner* — Dacthang P Ngo
(74) *Attorney, Agent, or Firm* — Harrity & Harrity, LLP

(57) ABSTRACT

The concept described herein relates to a device and a method for determining the transfer function of an angle sensor in the course of operation. For this purpose, a sequence of angle output signals of the angle sensor is received during at least one time interval in which the angle sensor is exposed to a rotating magnetic field. Furthermore, the transfer function of the angle sensor is determined on the basis of the sequence of angle output signals. The method can be carried out during regular operation of the angle sensor.

16 Claims, 15 Drawing Sheets

DEVICE AND METHOD FOR DETERMINING THE TRANSFER FUNCTION OF AN ANGLE SENSOR

CROSS REFERENCE TO RELATED APPLICATION

This application claims priority to German Patent Application No. 102019215949.4 filed on Oct. 16, 2019, the content of which is incorporated by reference herein in its entirety.

TECHNICAL FIELD

The present disclosure relates to a device and a method for determining the transfer function of an angle sensor in the course of the operation thereof. Some non-limiting example implementations relate to an autocalibration of a look-up table on the basis of the received angle output signals of the angle sensor for determining the transfer function of the angle sensor. Further non-limiting example implementations relate to an autocalibration of a look-up table on the basis of a probabilistic approach on the basis of empirically ascertaining probability density values of angle output signals for determining the transfer function of the angle sensor.

BRIEF DESCRIPTION

Angle sensors are used to determine the swept angle between two parts that are moving relative to one another. For this purpose, the angle sensor outputs a signal which permits the actual angle value to be deduced. On account of non-idealities, and in particular on account of anharmonic non-idealities of the sensor, the actual transfer function of the sensor can deviate from an ideal (linear) transfer function, such that the signal output by the sensor deviates from the actual angle value. This leads to inaccuracies in the measurement behavior of the sensor since the value measured by the sensor does not correspond to the angle actually swept.

In order to eliminate these inaccuracies, angle sensors can be calibrated. The transfer function of the angle sensor can be linearized using the calibration. By way of example, look-up tables describe a method for linearizing transfer functions of sensors. They can be used, inter alia, to compensate for anharmonic non-idealities in the case of (magnetic) angle sensors.

For this purpose, by way of example, a look-up table can be filled with values that serve to compensate for the non-idealities in the transfer function of the sensor. This is also referred to as calibration of a look-up table. Angle sensors are normally calibrated once, for example at the end of the production process in the factory, for example using corresponding calibration of a look-up table.

For the conventional calibration of the angle sensor or the look-up table, the actual angle value must be known in order that the deviations in the measured angle value can be determined and compensated for. This in turn requires a reference angle signal describing a base angle, with which the angle measured using the sensor can be compared and the sensor or the look-up table can subsequently be correspondingly calibrated. This necessity that the reference angle signal be present is sometimes a reason why the angle sensors are only calibrated once at the end of their production process. This means, however, that temperature-dictated or lifetime-dependent drifts of the anharmonic non-idealities, for example, cannot be compensated for in the course of operation at the actual target location of the angle sensor, which in turn leads to residual errors in the sensor signal. Thus, despite calibration having been carried out once, the transfer function of the sensor can deviate from an ideal (linear) transfer function at the actual location of use of the sensor, which is not correctable subsequently using simple means.

Accordingly, it would be desirable to improve known devices and methods for determining a transfer function of an angle sensor with regard to the existing technical disadvantages mentioned above.

One aspect of the present disclosure therefore relates to a method for determining a transfer function of an angle sensor in the course of operation. The method includes receiving a sequence of angle output signals of the angle sensor during at least one time interval in which the angle sensor is exposed to a rotating magnetic field. Furthermore, the method comprises determining the transfer function of the angle sensor on the basis of the sequence of angle output signals and during regular operation of the angle sensor.

In accordance with a further aspect, a device for determining a transfer function of an angle sensor in the course of operation is proposed. The device comprises a signal receiver configured to receive a sequence of angle output signals of the angle sensor during at least one time interval in which the angle sensor is exposed to a rotating magnetic field. Furthermore, the device comprises a signal evaluation device configured to determine the transfer function of the angle sensor on the basis of the sequence of angle output signals and during regular operation of the angle sensor.

BRIEF DESCRIPTION OF THE DRAWINGS

Implementations and further advantageous aspects of the method and of the device, respectively, are mentioned in the respective dependent patent claims.

Some example implementations are illustrated by way of example in the drawing and are explained below. In the figures.

DETAILED DESCRIPTION

Example implementations are described in greater detail below with reference to the figures, wherein elements having the same or a similar function are provided with the same reference signs.

Method steps which are illustrated in a block diagram and explained with reference thereto can also be carried out in a different order than that depicted or described. Moreover, method steps which relate to a specific feature of a device are interchangeable with precisely this feature of the device, which likewise holds true the other way around. In particular, the dependent patent claims directed to the method are also correspondingly combinable with the claimed device.

Figure 1:
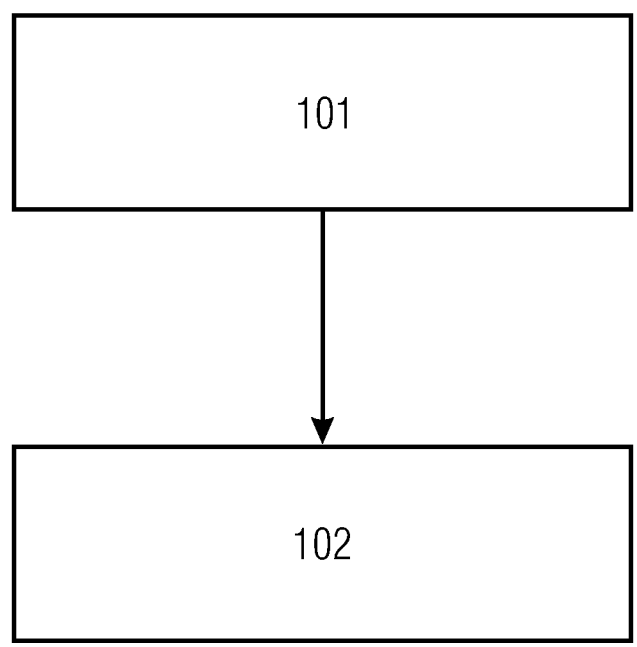
FIG. 1 shows a block diagram for illustrating a method in accordance with one example implementation.
Figure 2:
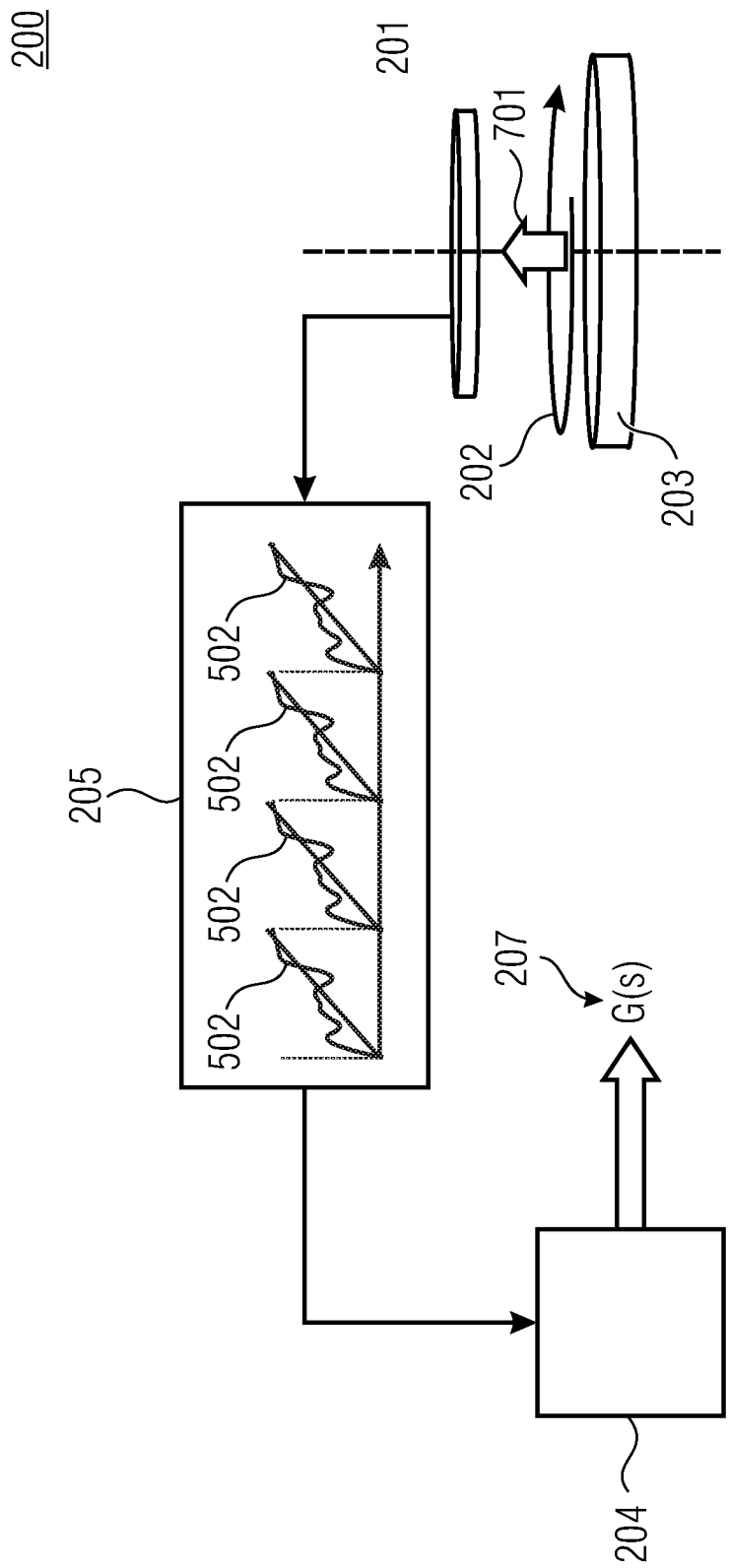
FIG. 2 shows a schematic block diagram of a device in accordance with one example implementation.

FIG. 1 shows a schematic block diagram of a method 100 in accordance with one example implementation of the innovative concept described herein. FIG. 2 shows a corresponding device 200 for carrying out the method 100.

The method 100 serves for determining the transfer function 207 of an angle sensor 201, specifically in the course of operation of the angle sensor 201. This differentiates the method 100 described herein from the conventional single calibration of the sensor at the end of the production thereof, for example in the factory.

In block 101, firstly a sequence 205 of angle output signals 502 of the angle sensor 201 is received, specifically during at least one time interval in which the angle sensor 201 is exposed to a rotating magnetic field 202.

In block 102, the transfer function 207 of the angle sensor 201 is then determined, specifically on the basis of the previously received sequence 205 of angle output signals 502. In addition, the method 100 is carried out during regular operation of the angle sensor 201.

The method 100 can be carried out at least once during the use of the angle sensor 201 at the intended target location thereof. It is likewise conceivable for the method 100 to be carried out multiply, and in particular continuously, during the use of the angle sensor 201 at the intended target location thereof.

The angle sensor 201 can be for example a magnetic or inductive angle sensor for monitoring rotating components. The target location or location of use of the angle sensor 201 would accordingly be the location at which the angle sensor 201 is positioned (for example installed) after its production and delivery, in order to perform its intended use there, for example measuring the rotation angle of a rotating component, such as a shaft in a motor, for example. In the case of conventional angle sensors, by contrast, the transfer function thereof is ascertained only once, for example at the end of their production process in the factory, and the angle sensor is calibrated once before delivery. Therefore, changes in the transfer function of the angle sensor which arise only after the delivery thereof at the location of use can no longer be compensated for in the course of operation in the case of conventional angle sensors.

FIG. 2 shows a schematic block diagram of a corresponding device 200 for determining the transfer function 207 of an angle sensor 201 in the course of operation in accordance with one implementation of the concept described herein.

The device 200 comprises an angle sensor 201. The angle sensor 201 is exposed to a rotating magnetic field 202. The magnetic field 202 can originate from a magnetic source 203, which can be arranged for example at a rotating component. The signal 701 tapped off by the angle sensor 201 in this case from the rotating magnetic field 202 is also referred to herein occasionally as angle input signal, or as true or real angle, or simply as rotation angle.

The angle sensor 201 is configured to determine the rotation angle of the relative movement between the angle sensor 201 and the rotating magnetic field 202, the rotation angle being swept during a specific time interval. For this purpose, the angle sensor 201 can convert the angle input signal into a corresponding angle output signal 502, or into a sequence 205 of successive angle output signals 502.

The device 200 furthermore comprises a signal processing device 204. The signal processing device 204 is configured to receive the sequence 205 of angle output signals 502 of the angle sensor 201, specifically during the time interval in which the angle sensor 201 is exposed to the rotating magnetic field 202. In the non-limiting example illustrated here, the angle sensor 201 sweeps a full 360° four times in total within the depicted time interval, which results in the four curves or angle output signals 502 shown in block 205.

The signal processing device 204 is furthermore configured to determine the transfer function 207 of the angle sensor 201, specifically on the basis of the sequence 205 of angle output signals 502. Furthermore, the device 200 is configured to ascertain the transfer function 207 during regular operation of the angle sensor 201.

One advantage of the device 200 disclosed herein and of the corresponding method 100 described herein is that determining the transfer function 207 can be carried out not just in the course of operation of the angle sensor 201, rather this is able to be implemented even in the absence of an otherwise required reference angle signal describing a base angle.

Figure 3:
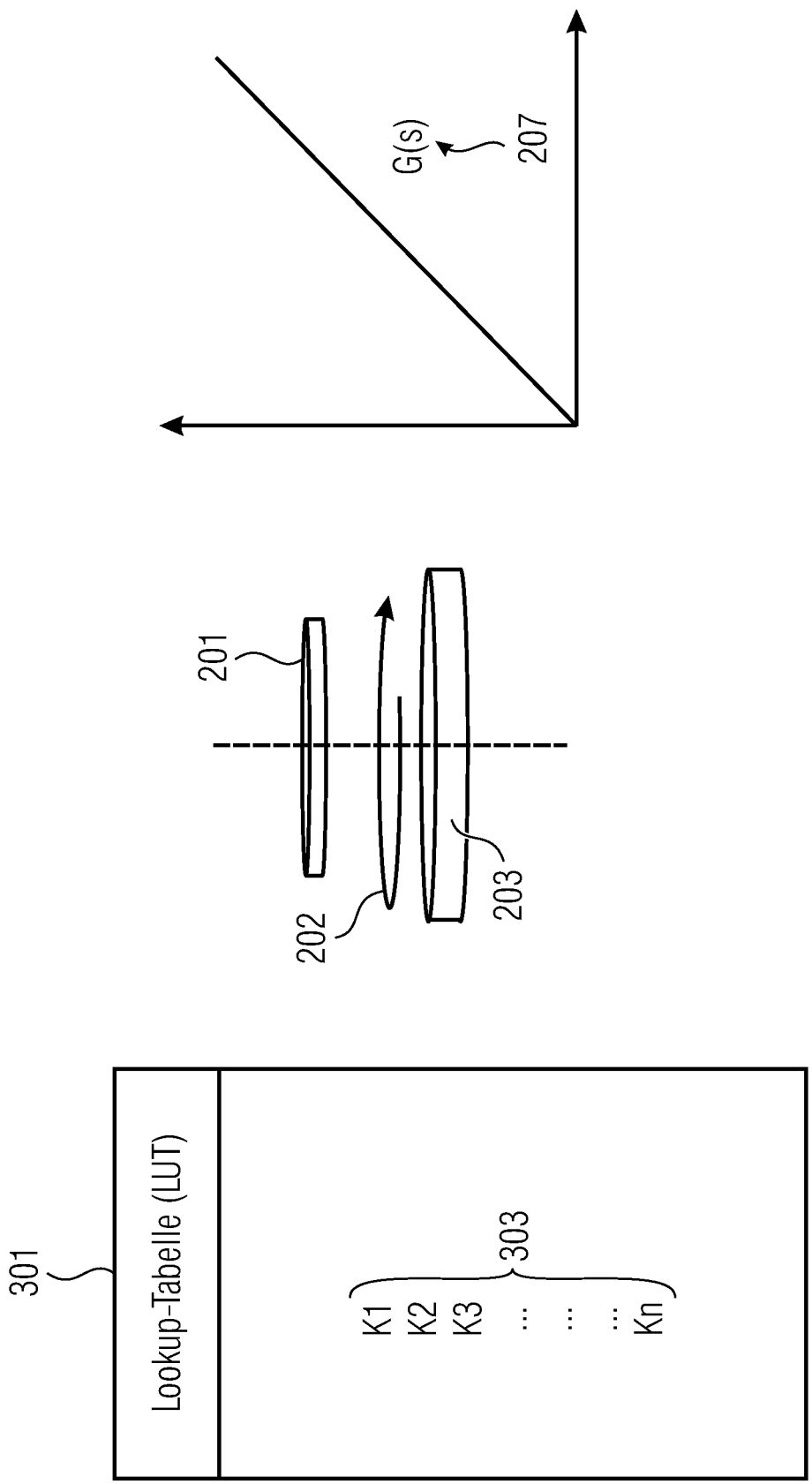
FIG. 3 shows a schematic block diagram of a look-up table in accordance with one example implementation.

FIG. 3 shows a non-limiting example implementation in which the angle sensor 201 can be calibrated using a look-up table 301. The look-up table 301 can have one or more correction values K1, K2, . . . , Kn for linearizing the transfer function 207 of the angle sensor 201.

The look-up table 301 can be precalibrated, for example ex works. That is to say that the precalibrated look-up table 301 can be filled with a corresponding precalibrated version 303 of correction values K1, K2, . . . , Kn before the first use of the angle sensor 201 at the target location thereof. By way of example, the correction values K1, K2, ..., Kn can be ascertained in the factory or in the laboratory, or they can have a predefined default value, or they can also initially be set to zero.

The precalibrated version 303 of the one or more correction values K1, K2, ..., Kn can then be used to correct irregularities in the transfer function 207 of the angle sensor 201 and to linearize the transfer function 207 and to obtain a correspondingly corrected angle output signal.

Figure 4:
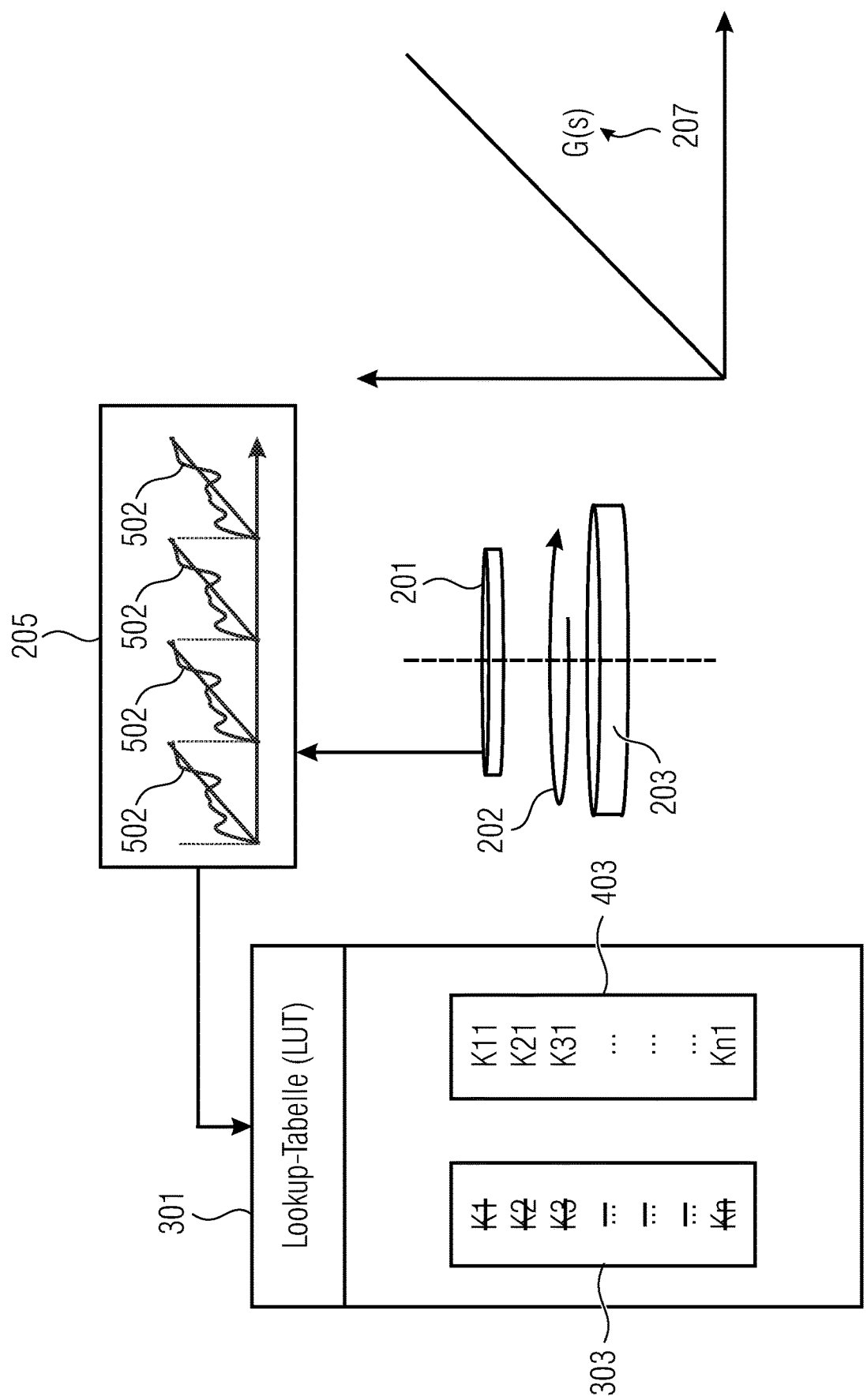
FIG. 4 shows a schematic block diagram for updating or recalibrating the look-up table in accordance with one example implementation.

As is shown in FIG. 4, the look-up table 301 in accordance with the concept described herein can be recalibrated at least once, or else multiply and repeatedly, by the look-up table 301 being filled with an updated version 403 of the one or more correction values K11, K21, ..., Kn1, wherein the updated version 403 of the one or more correction values K11, K21, ..., Kn1 can be determined on the basis of the received sequence 205 of angle output signals 502. One advantage here is that no reference angle signal is required. Instead, the received angle output signals 502 are used directly for calibrating or recalibrating the look-up table 301, even though the actual rotation angle is not known at all.

Recalibrating the look-up table 301, LUT for short, is also referred to herein as LUT autocalibration and is substantially synonymous with (repeatedly) filling the look-up table 301 with the respective updated version 403 of the one or more correction values K11, K21, ..., Kn1.

Some non-limiting example implementations are mentioned below which describe how the recalibration of the look-up table 301 can be carried out on the basis of the sequence 205 of angle output signals 502.

Figure 5:
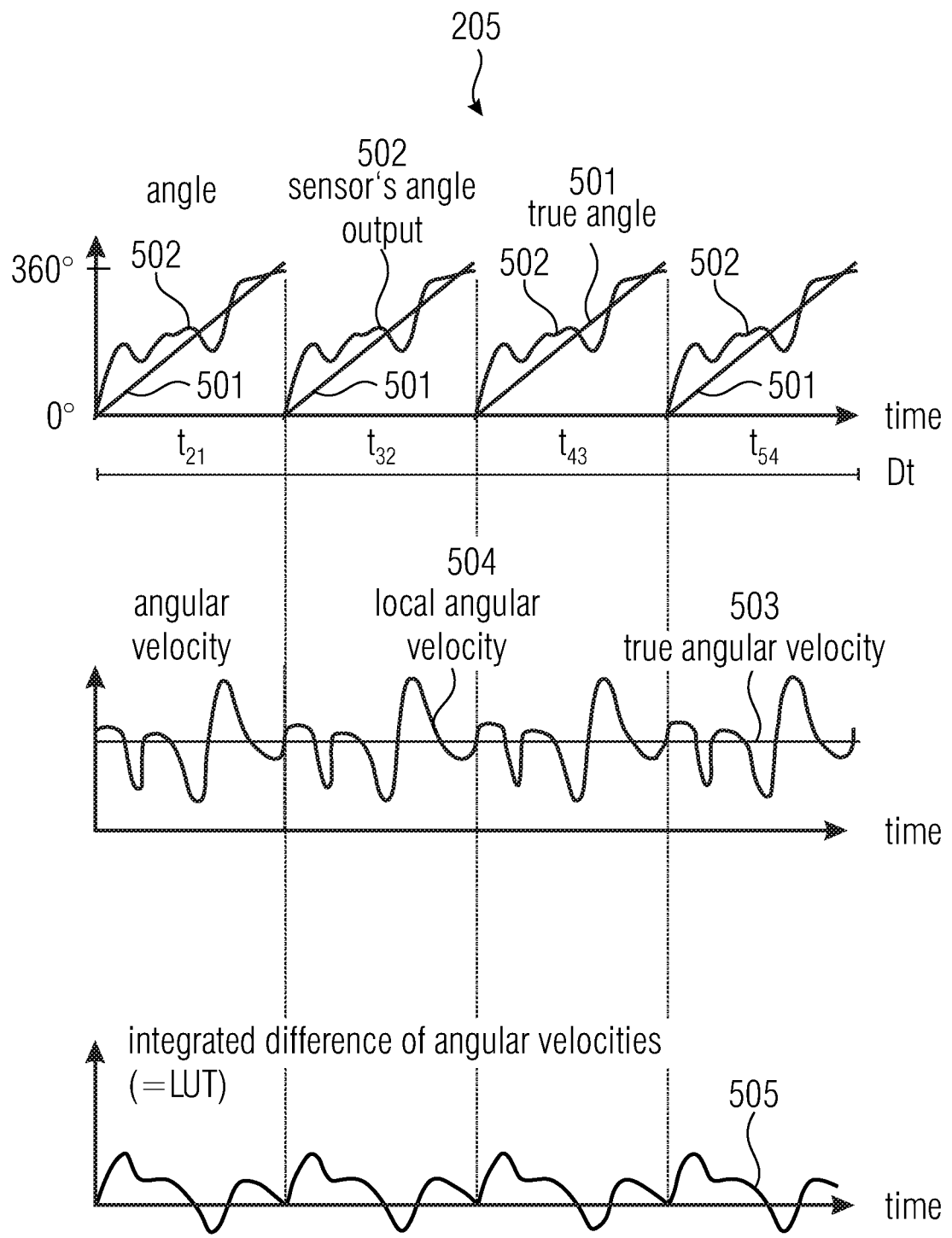
FIG. 5 shows a diagram for illustrating angle signals and angular velocity signals for calculating the updating of the look-up table in accordance with one example implementation.

FIG. 5 shows one non-limiting example implementation of this type. The sequence 205 of angle output signals 502 is depicted in the topmost diagram. In the time interval Δt chosen purely by way of example, the angle of 360° is swept four times in total, specifically in the intervals t21, t32, t43 and t54. That is to say that the rotating magnetic field 202 has effected a total of four full rotations relative to the angle sensor 201.

The characteristic curve 501 with gradient y=1 represents the actual angle value, e.g. the true rotation angle. This characteristic curve 501 thus corresponds to a completely linearized transfer function of an ideal angle sensor. The characteristic curve 502 represents the angle output signals received by the real, and non-ideal, angle sensor 201. As can be discerned, this characteristic curve 502 deviates from the completely linearized transfer function characteristic curve 501 on account of (harmonic) non-idealities.

In the case of the rotating magnetic field 202, the assumption can be made that there are time intervals in which the magnetic field 202 has a substantially constant rotational speed, for example in an application of the angle sensor 201 at a rotating shaft. The constant rotational speed dictates a constant angular velocity. That is to say that the assumption can be made that there are time intervals in which the magnetic field 202 has a substantially constant angular velocity.

Time intervals of this type can be derived directly from the angle output signal of the angle sensor 201, for example by the period of the angle output signal 502 being checked for fluctuations. The period can be measured for example by the time difference between the zero crossings of the sine and cosine signal components being analyzed.

The angular velocity is depicted in the middle diagram in FIG. 5, in which the actual angular velocity, assumed to be constant, is depicted in the form of the line 503, also referred to as true angular velocity. In addition, the curve 504 can be discerned, this curve describing the angular velocity associated with the angle sensor 201, which is also referred to as local angular velocity. The local angular velocity can be measured, or derived from the angle output signal 502 of the angle sensor 201, for example using the differentiation of the angle output signal 502 with respect to time.

During the time interval Δt in which the angular velocity can be assumed to be substantially constant, the local angular velocity can thus be determined from the angle output signal 502 of the angle sensor 201. By way of example, the local angular velocity can be estimated by the finite difference quotient of two successive angle values being formed. That is to say that the difference of two successive angle values is divided by the sampling rate.

In the case of an ideal sensor, the local angular velocity 504 would be exactly equal to the true angular velocity 503. That is to say that in time intervals Δt with constant angular velocity 503, inherently and per se the local angular velocity 504 would also have to be constant. However, since, as mentioned in the introduction, (harmonic) non-idealities can lead to a non-ideal behavior of the real angle sensor 201, the local angular velocity 504 can deviate from the true angular velocity 503, as can be seen purely by way of example in the middle diagram in FIG. 5. That is to say that deviations from the ideal transfer characteristic curve 503 of the angle sensor 201 lead to changes or variances in the local angular velocity 504.

One example implementation provides for making it possible to integrate these deviations of the local angular velocity 504 from the mean angular velocity in order thus to determine or to estimate the actual transfer function 207 of the angle sensor 201. Subtracting the undetermined integration constant in the form of the mean value of the integrated deviations yields the look-up table 301 or the updated version 403 of the one or more correction values K11, K12, ..., Kn1 for recalibrating the look-up table 301.

In accordance with one example implementation, the method thus provides for forming the mean value of the local angular velocity 504 and for determining the deviations of the local angular velocity 504 (see FIG. 5, middle) vis-à-vis the mean value. The true angular velocity 503, for example, can be used as the mean value. These deviations from the mean value can then be integrated (see FIG. 5, bottom). If the mean value of these integrated deviations is subtracted from said integrated deviations, the integrated values 505 are obtained, which then correspond to the updated version 403 of the one or more correction values K11, K12, ..., Kn1 which can be used for updating or recalibrating the look-up table 301.

It is again important here to mention that the look-up table 301 or the updated version 403 of the one or more correction values K11, K12, ..., Kn1 is not determined directly from the angle output signal 502 of the angle sensor 201 since neither the true rotation angle at a specific point in time nor the true angular velocity is known. Therefore, in accordance with the concept disclosed herein, even if at first glance it may not seem intuitive, firstly the angle output signal 502 of the angle sensor 201 is differentiated, the mean value is subtracted, followed by integration, and then the mean value can be subtracted again. This concept is also referred to herein as autocalibration of the look-up table 301 or, in abbreviated form, as LUT autocalibration.

Accordingly, example implementations provide that the at least one time interval Δt in which the sequence 205 of angle output signals is received includes a time interval during which the actual angular velocity 502 of a rotation between the rotating magnetic field 202 and the angle sensor 201 is substantially constant, and wherein the updated version 403 of the one or more correction values K11, K21, . . . , Kn1 is ascertained on the basis of an angular velocity signal 504 which is determinable from the received sequence 205 of angle output signals 502.

The updated version 403 of the one or more correction values K11, K21, . . . , Kn1 can then be determined on the basis of a difference between the angular velocity signal 504 and a mean value of the angular velocity signal 504.

In summary, FIG. 5 thus shows firstly the angle output signals 502 during a time interval Δt in which the rotating magnetic field 202 rotates relative to the angle sensor 201 at a substantially constant angular velocity. In this case, the true rotation angle 501 changes linearly (with 360° periodicity) as a function of time (see FIG. 5, top). Any deviations of the angle output signal 502 vis-à-vis the true rotation angle 501 reflect the imperfect transfer function 207 of the angle sensor 201, which can be linearized as much as possible using compensating for the deviations, for example using the look-up table 301.

A differentiation of the angle output signal 502 with respect to time yields the local angular velocity 504 (see FIG. 5, middle). In this case, the irregularities in the transfer function 207 of the angle sensor 201 lead to variances in the local angular velocity 504. The variances can be determined for example by subtracting the mean value of the angular velocity from the local angular velocity 504.

Afterward, the differences thus ascertained between the local angular velocity 504 and the mean value can be integrated (see FIG. 5, bottom). The integration, and optionally also a suitable scaling, yield the sought and previously unknown irregularities in the transfer function 207 of the angle sensor 201. These irregularities thus determined correspond to the look-up table 301 or the updated version of the one or more correction values K11, K12, . . . , Kn1 for updating or recalibrating the look-up table 301.

Figure 6:
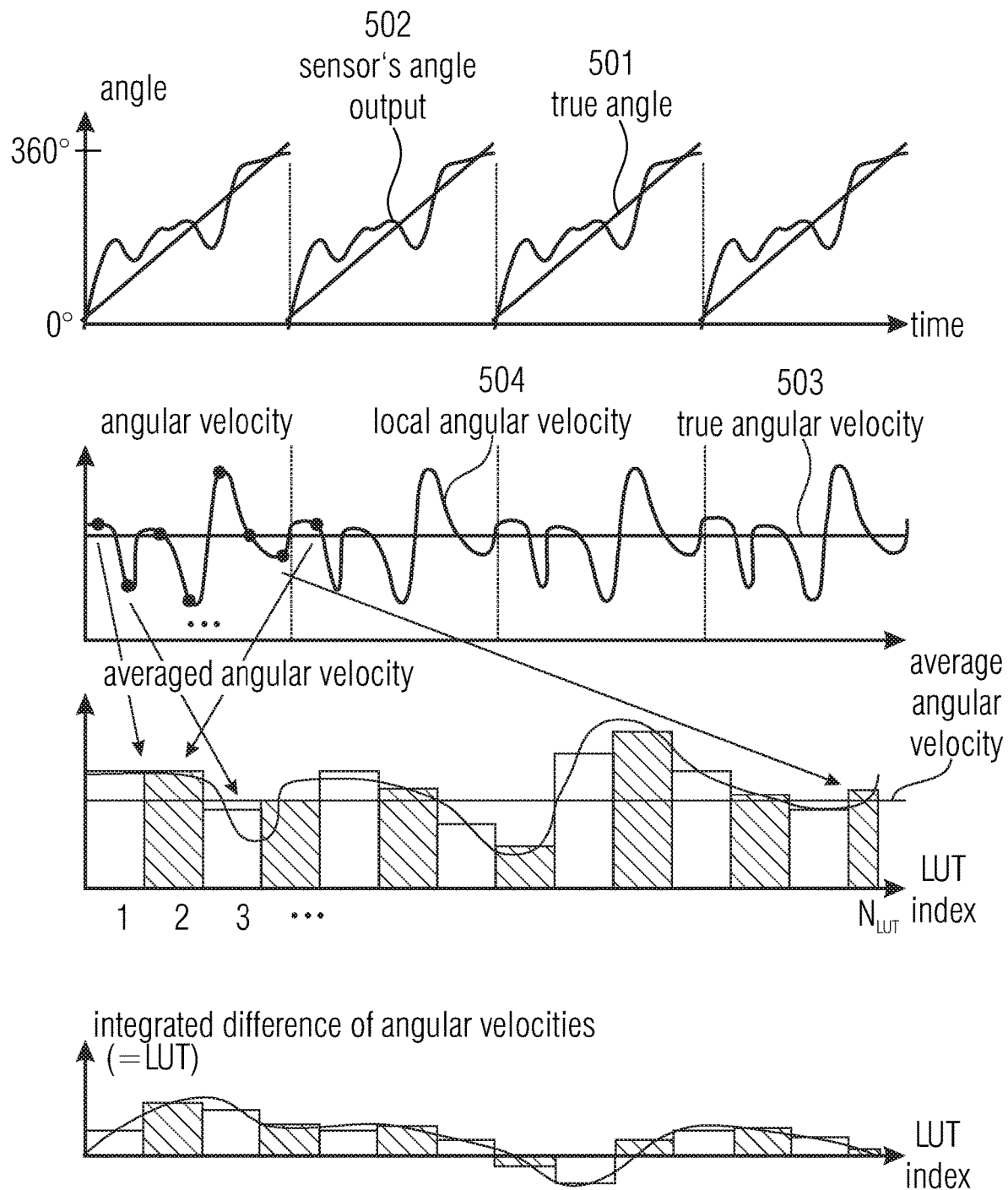
FIG. 6 shows a diagram for illustrating discretized angle signals and discretized angular velocity signals for calculating the updating of the look-up table in accordance with one example implementation.

FIG. 6 shows a graphical representation of one possible implementation example. The digital domain with sampling and discretization of the angle output signal 502 and respectively the angular velocity signal 504 is employed here. In this case, FIG. 6 shows, inter alia, the binning, e.g. the assignment or classification, of individual samples (black points) into different registers (white and hatched bars in the penultimate and last diagrams in FIG. 6—white bars for odd numbers, hatched bars for even numbers).

A mathematical treatment of the concept disclosed herein will follow, inter alia with reference to FIGS. 5 and 6. In this case, true values are designated by the circumflex ^. The assumed constant angular velocity, designated by $\hat{\omega}$, results in a true rotation angle as a function of time $\hat{\alpha}(t) = \hat{\omega} \cdot t + \hat{\alpha}_0$. In this case, $\hat{\alpha}_0$ is the freely selectable, but fixed initial angle. With a constant sampling period Ts, a number $N_{Samples}$ of output angle signals are obtained. These samples are designated by wherein the sample index i ranges from 1 to $N_{samples}$. The corresponding true rotation angles are then given as $\hat{\alpha}(t_i) = \hat{\omega} \cdot T_s \cdot (i-1) + \hat{\alpha}_0$.

The true look-up table 301 in turn, which corresponds to the deviations of the transfer function 207 of the angle sensor 201 vis-à-vis the true angle value, is defined as $\widehat{LUT}(\alpha) = \alpha - \hat{\alpha}(\alpha)$. This therefore corresponds (for a specific angle α, and apart from signal noise) to the difference between the value supplied by the angle sensor 201, e.g. between the angle output signal 502, and the true angle value 501. Since the true look-up table 301 is intended to describe only the anharmonic errors, it can be assumed that the mean vanishes over 360°, e.g.

$$\frac{1}{360°}\int_0^{360°} \widehat{LUT}(\alpha)\, d\alpha = 0. \quad (1)$$

In reality, the look-up table 301 will have only a finite number of support points, designated by $N_{LUT}$.

The true look-up table 301 nevertheless allows the angle output signal 502 to be expressed in relation to the true angle, namely by way of the equation $$\alpha_i = \widehat{LUT}(\alpha_i) + \hat{\alpha}_i + \varepsilon_i = \widehat{LUT}(\alpha_i) + \hat{\omega} \cdot T_s \cdot (i-1) + \hat{\alpha}_0 + \varepsilon_i. \quad (2)$$

The sensor noise $\varepsilon_i$ is introduced in equation (2), but the expected value of the sensor noise can be assumed to vanish. The averaging described later in combination with the binning allows the sensor noise to be disregarded in the subsequent derivation.

The calculation of the local angular velocity 504 on the basis of two successive samples using the finite difference quotient method yields:

$$\omega_i = \frac{\alpha_i - \alpha_{i-1}}{T_s} = \frac{(\widehat{LUT}(\alpha_i) - \widehat{LUT}(\alpha_{i-1}))}{T_s} + \hat{\omega} \quad (3)$$

It is known from equation (1) that if the mean value is formed over a complete rotation of 360°, the contributions of the look-up table 301 vanish, which results in the following equation:

$$\overline{\omega} = \frac{1}{N_{samples}} \sum_{i=1}^{N_{samples}} \omega_i \approx \hat{\omega} \quad (4)$$

Subtracting the mean value of the angular velocity from equation (4) yields:

$$\omega_i - \overline{\omega} = \frac{(\widehat{LUT}(\alpha_i) - \widehat{LUT}(\alpha_{i-1}))}{T_s}. \quad (5)$$

Numerical integration of this equation results in a look-up table 301 with the following equation, although the look-up table 301 can still have a not inconsiderable offset, e.g. on account of the initial undetermined integration constant:

$$lut(\alpha_j) = T_s \cdot \sum_{i=1}^{j} (\omega_i - \overline{\omega}) = \widehat{LUT}(\alpha_j) - \widehat{LUT}(\alpha_0). \quad (6)$$

By applying the boundary condition from equation (1), however, the integration constant can be unambiguously determined as $$C = \frac{1}{N_{samples}} \sum_{j=1}^{N_{samples}} lut(\alpha_j) = \widehat{LUT}(\alpha_0). \quad (7)$$

Inserting this integration constant in equation (6) yields:

$$LUT(\alpha_j) = lut(\alpha_j) + C = \overline{LUT}(\alpha_j), \quad (8)$$

It is evident from this that the LUT autocalibration described herein reproduces the true look-up table 301 for recalibrating the angle sensor 201. In other words, this corresponds to the updated version 403 of the one or more correction values K11, K12, . . . , Kn1 with which the look-up table 301 can be filled in order to update it in the course of operation and at the intended location of use of the angle sensor 201. In this case, the look-up table 301 can be updated repeatedly, of course.

The above derivation can then also be limited to a finite number $N_{LUT}$ of LUT support points in order to ensure a numerical implementability in accordance with FIG. 6. For each support point of the index k from 1 to $N_{LUT}$, it is possible firstly to initiate two register values with zero, for example a first register value $w_k$ for summing the discretized local angular velocities, and a second register value $n_k$ for adding up the number of samples in the respective bin.

For each sample with index i, it is possible to ascertain that support point (e.g. with index k) which is closest to the current angle sample $\alpha_i$. Here the local angular velocity from equation (3) can be added to the register, where $w_k = w_k + \omega_i$, and $n_k$ can be increased by 1, e.g. $n_k = n_k + 1$. For greater accuracy, weighted binning can be carried out, wherein a sample is distributed between the two closest support points. The binning makes it possible to collect a multiplicity of samples in a support point, as a result of which the sensor noise can be averaged out, provided that a sufficiently high number of samples can be acquired. After all of the samples have been processed, the registers can be scaled, in accordance with $w_k' = w_k / n_k$.

Apart from a suitable scaling and the replacement of $N_{samples}$ by $N_{LUT}$, the remaining equations even with binning remain more or less unchanged. This results in the correspondingly modified equations:

$$\bar{w} = \frac{1}{N_{LUT}} \sum_{k=1}^{N_{LUT}} w_k' \approx \bar{\omega}, \quad (9)$$

$$lut(\alpha_l) = T_s \cdot \sum_{k=1}^{l} (w_k - \bar{w}) = \overline{LUT}(\alpha_l) - \overline{LUT}(\alpha_0), \quad (10)$$

$$C = \frac{1}{N_{LUT}} \sum_{l=1}^{N_{LUT}} lut(\alpha_l), \quad (11)$$

$$LUT(\alpha_l) = \frac{N_{samples}}{N_{LUT} \cdot N_{revs}} \cdot (lut(\alpha_l) + C) = \overline{LUT}(\alpha_l). \quad (12)$$

The number $N_{revs}$ of revolutions that took place during the sampling process has been introduced in the last equation. Since this is not directly accessible by way of $(\alpha_{Nsamples} - \alpha_1)$ on account of the periodicity of 360°, it can be obtained for example using integration over the collected local angular velocities (e.g. before the scaling).

$$N_{revs} = \frac{1}{360°} \sum_{k=1}^{N_{LUT}} w_k. \quad (12)$$

There are a number of possibilities for checking the fundamental assumption of the substantially constant angular velocity during the recalibration. By way of example, an $N_{poly}$-th order polynomial can be applied to the local angular velocities. Afterward, it is possible to check whether all polynomial coefficients with the exception of the zeroth order are sufficiently small (for checking the constant angular velocity) and whether the residual norm is sufficiently small (which corresponds to a good polynomial fit). Polynomial fitting with a $0^{th}$ order polynomial, e.g. a constant function, is particularly well suited.

Before the application of a look-up table 301, harmonic non-idealities (e.g. constant and/or proportional to the sine or cosine of the angle) can be corrected using a so-called amplitude phase offset (AOP) compensation. For this purpose, it is possible to use autocalibration methods which can optimize the parameters for the compensation during the application. This reduces undesired effects that harmonic non-idealities, for example caused by temperature or lifetime drift, have on the residual angle error.

Figure 7:
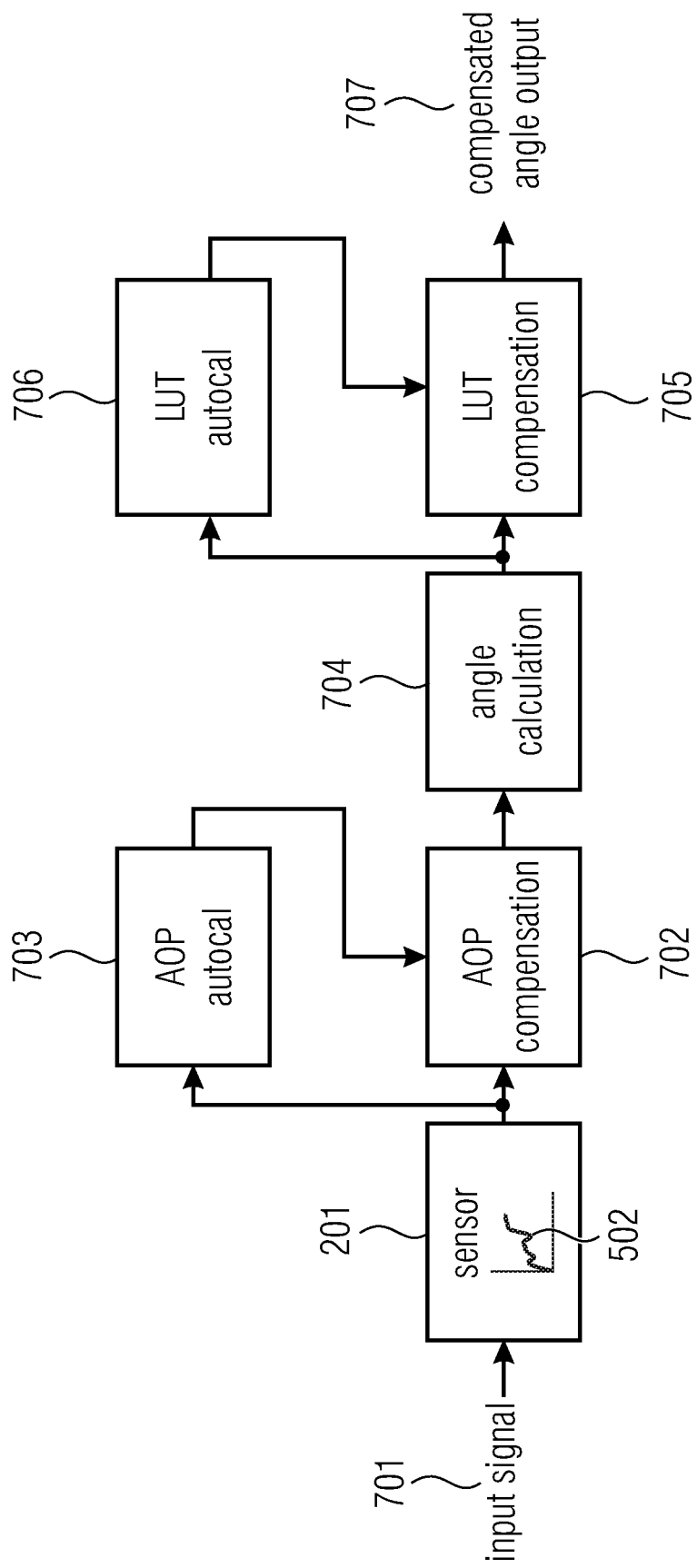
FIG. 7 shows a block diagram for illustrating the application of the concept of LUT autocalibration described herein in a sensor application in accordance with one example implementation.
Figure 8:
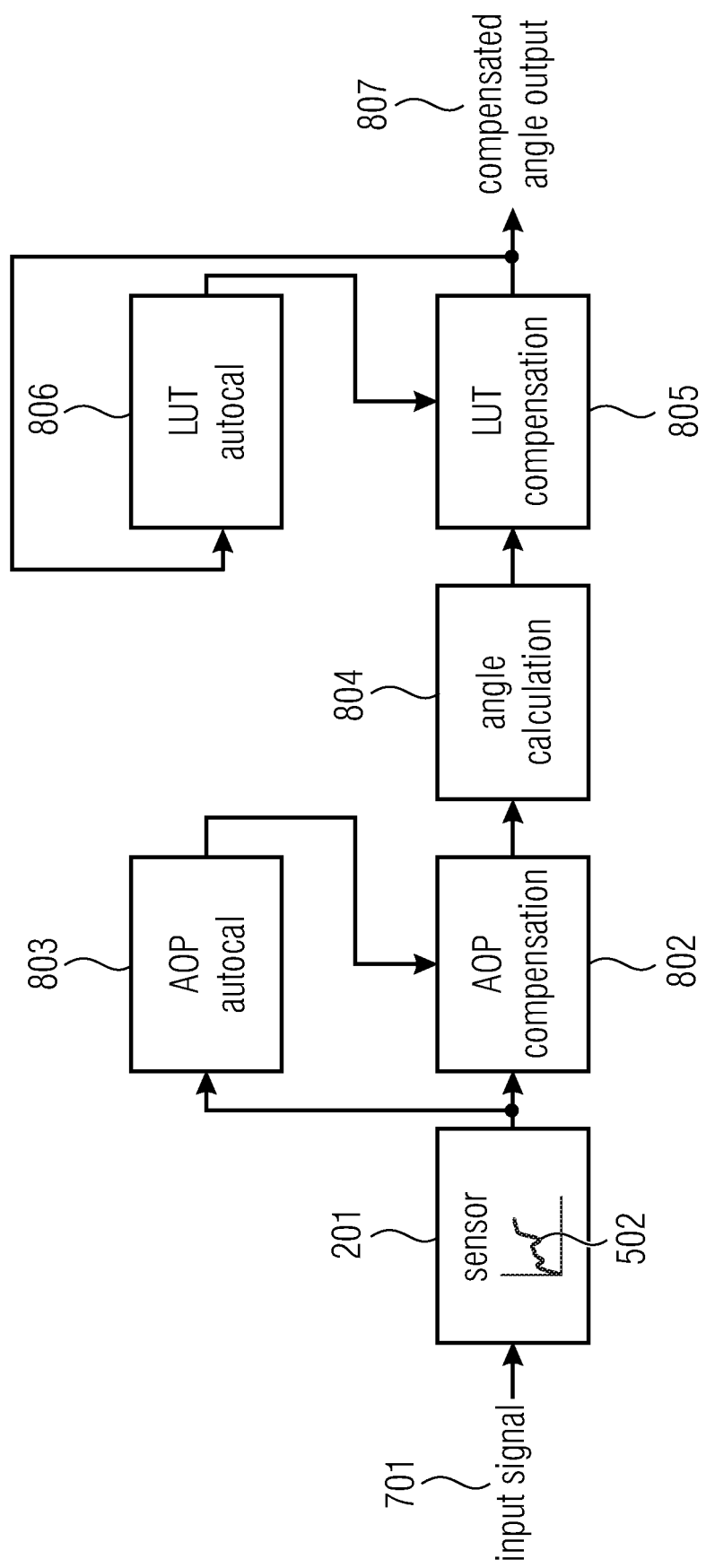
FIG. 8 shows a block diagram for illustrating the application of the concept of iterative LUT autocalibration described herein in a sensor application in accordance with one example implementation.

FIGS. 7 and 8 show non-limiting examples of the concept described herein so as to illustrate using block diagrams how the LUT autocalibration described herein can be integrated in an angle sensor application.

The angle input signal 701 is a substantially periodic signal that arises during a rotation at a substantially constant angular velocity. The real and generally non-ideal angle sensor 201 translates this angle input signal 701 into an electrical or logical intermediate signal 502. Afterward, an AOP compensation 702, 802 and optionally an AOP autocalibration 703, 803 can be carried out in order to correct or compensate for the harmonic non-idealities. Both the AOP compensation 702, 802 and the AOP autocalibration 703, 803 are optional, however.

The (optionally AOP-corrected) signal 502 of the angle sensor 201 can then be fed to an angle calculation unit 704, 804. The angle calculation unit 704, 804 converts the signal 502 of the angle sensor 201 into angle values, which can then in turn be used as input for the subsequent LUT compensation 705, 805 and LUT autocalibration 706, 806. The LUT autocalibration 706, 806 can calculate the look-up table 301 or the updated version 403 of the one or more correction values K11, K21, . . . , Kn1 using the angle signal values and also using the angular velocities derivable therefrom in accordance with the explanations and equations above.

That is to say that the LUT autocalibration 706, 806 is used in accordance with the explanations above in order to ascertain the optimum look-up table 301 for the respective angle sensor 201. The optimum look-up table 301 can then be used in the LUT compensation 705, 805 in order to correct or compensate for the non-idealities of the angle sensor 201 and thus to obtain the best possible corrected or compensated angle output signal 707, 807, which corresponds as well as possible, or in the best case exactly, to the true angle value, e.g. the angle input signal 701.

The block diagram depicted by way of example in FIG. 8 differs from the block diagram depicted in FIG. 7 inter alia in that the angle output signal 807 corrected or compensated in the LUT compensation 705, 805 is fed back into the LUT autocalibration 806. The example implementation depicted in FIG. 8 thus involves an iterative LUT autocalibration 806, which can improve the quality of the LUT compensation 805.

That is to say that the LUT autocalibration 806 can be calculated from the already LUT-compensated angle output signal 807 of the angle sensor 201. The result of a single LUT autocalibration is therefore not the look-up table 301 itself, but rather an increment that is added to the existing look-up table 301. It is expedient to initialize the look-up table 301, for which purpose, for example, all the correction values K1, K2, . . . , Kn initially contained in the look-up table 301 are set to zero, which would correspond to an ideal sensor.

Accordingly, the sequence of the iterative LUT autocalibration 806 illustrated in FIG. 8 would thus be summarized as follows:
1. Initialize the look-up table (e.g. by zeroing)
2. Carry out the LUT autocalibration
3. Add the result obtained to the already existing look-up table
4. Continue at step 2.

This sequence can be carried out continuously in the background, for example, in the sensor application.

Generally, the (iterative) LUT autocalibration 706, 806 can be effected during the application of the angle sensor 201 in the course of operation and in the intended area of use of the angle sensor 201. The calculation of the one or more correction values K11, K21, . . . , Kn1 of the look-up table 301 can be carried out directly in the angle sensor 201 itself. Alternatively or additionally, the calculation can be carried out in an external microcontroller, for example. For an external LUT autocalibration 706, 806 of this type, for example the resulting look-up table 301 could be used in the external microcontroller for the LUT compensation 705, 805, or it could be programed into the angle sensor 201 itself and be used directly by the angle sensor 201 for the LUT compensation 705, 805.

One possible implementation of the concept described herein in Matlab shall be described below:

```
function LUT = autocalLUT(uniformly_sampled_angles, N_LUT)
% Autocalibration of the look-up table (LUT) of an angle sensor
using the
% finite difference approach. Requires constant angular acceleration
during
% sample acquisition.
%
% Inputs:
% uniformly_sampled_angles ... Sensor's angle output, sampled at a
%                       constant sampling frequency.
% N_LUT          ... Number of grid points of the LUT
  % angular distance between two LUT grid points
  LUT_delta = 360/N_LUT; % [deg]
  % Only have to check "constant angular velocity" assumption:
  sum_of_angle_changes = 0;
  sum_of_squared_angle_changes = 0;
  accum_angle_changes = zeros(1,N_LUT);
  accum_N = zeros(1,N_LUT);
  for cnt = 2:numel(uniformly_sampled_angles)
    % Binning with linear weights:
    % The 0.5 centers the final LUT w.r.t. the true one. This is
    % due to the finite (N_LUT) grid point integration.
    float_index = 1 ...
      + mod(0.5+uniformly_sampled_angles(cnt)/LUT_delta,
      N_LUT);
    left = floor(float_index);
    weight = float_index - left;
    if left < N_LUT
      right = left+1;
    else
      % due to periodicity, the right neighbor of the last LUT grid
      % point is the first grid point
      right = 1;
    end
    angle_change = wrapTo180(uniformly_sampled_angles(cnt) ...
      - uniformly_sampled_angles(cnt-1)); % [deg]
    accum_angle_changes(left) = ...
      accum_angle_changes(left) + angle_change*(1-weight); % [deg]
    accum_angle_changes(right) = ...
      accum_angle_changes(right) + angle_change*weight; % [deg]
    accum_N(left) = accum_N(left) + (1-weight);
    accum_N(right) = accum_N(right) + weight;
```

```
    sum_of_angle_changes = sum_of_angle_changes + angle_
      change; % [deg]
    sum_of_squared_angle_changes = ...
      sum_of_squared_angle_changes + angle_change^2; % [deg^2]
  end
  % Only have to check "constant angular velocity" assumption:
  % average of angle changes
  avg_angle_change = sum_of_angle_changes...
    /(numel(uniformly_sampled_angles)-1); % [deg]
  avg_squared_angle_change = sum_of_squared_angle_changes...
    /(numel(uniformly_sampled_angles)-1); % [deg^2]
  % variance of angle changes
  var_angle_change = ...
    avg_squared_angle_change^2 - avg_angle_change^2; % [deg^2]
  % not implemented: check that variance of angle changes is
  sufficiently
  % small
  num_revs = sum(accum_angle_changes)/360; % number of
  revolutions/turns
  % average accumulated angle_changes
  angle_changes = accum_angle_changes./accum_N; % [deg]
  % estimate for the true angle change (which is constant for uniformly
  % sampled angles and constant angular velocity (assumption)!)
  est_true_angle_change = mean(angle_changes); % [deg]
  % deviation from true angle_change
  deviation_of_angle_changes = ...
    angle_changes - est_true_angle_change; % [deg]
  % integrate to obtain deviations from ideal angle
  deviation_of_angle = cumsum(deviation_of_angle_changes); % [deg]
  % estimate for the true angle offset
  est_angle_offset = mean(deviation_of_angle); % [deg]
  unsealed_LUT = deviation_of_angle - est_angle_offset; % [deg]
  scaling = numel(uniformly_sampled_angles)/N_LUT/num_revs;
  LUT = unsealed_LUT * scaling; % [deg]; the final estimator for
  the LUT
end
```

The complete process was implemented in Matlab and verified therein by the inventors. A sensor model with a randomly chosen transfer function was modeled in this case. A certain number of equidistantly spaced reference angle samples were input into the sensor model. The sensor output was input into the function autocalLUT( ), which calculates the optimum look-up table in accordance with the concept described herein.

Figure 9A:
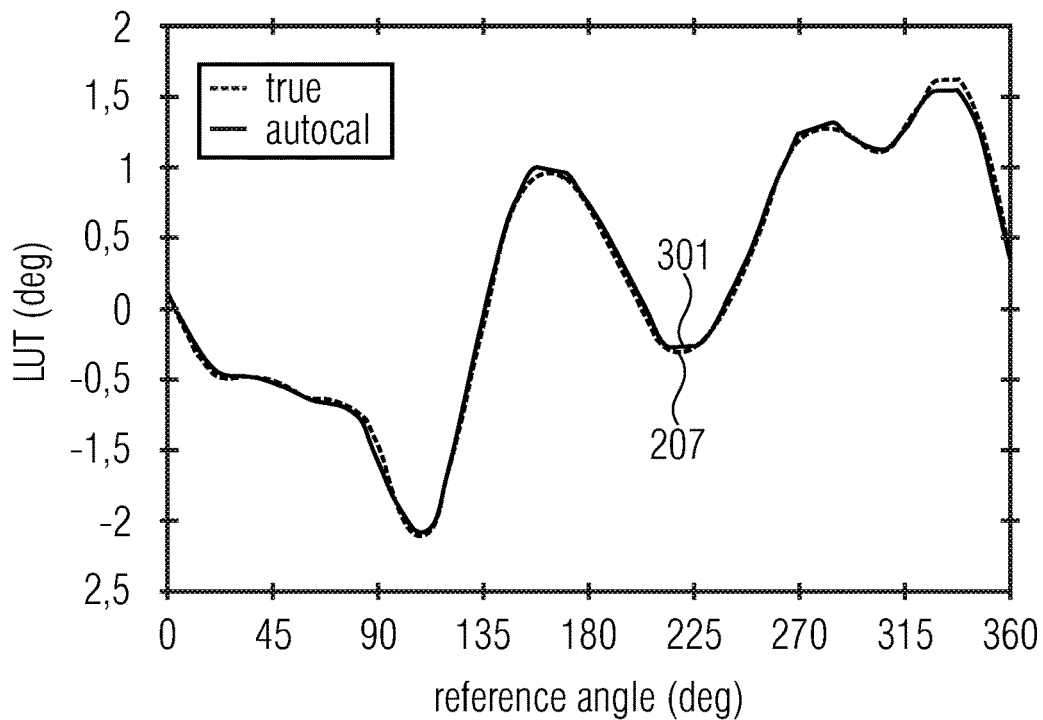
FIGS. 9A, 9B show depictions for elucidating a signal analysis of sensor signals for verifying the concept of LUT autocalibration described herein.
Figure 9B:
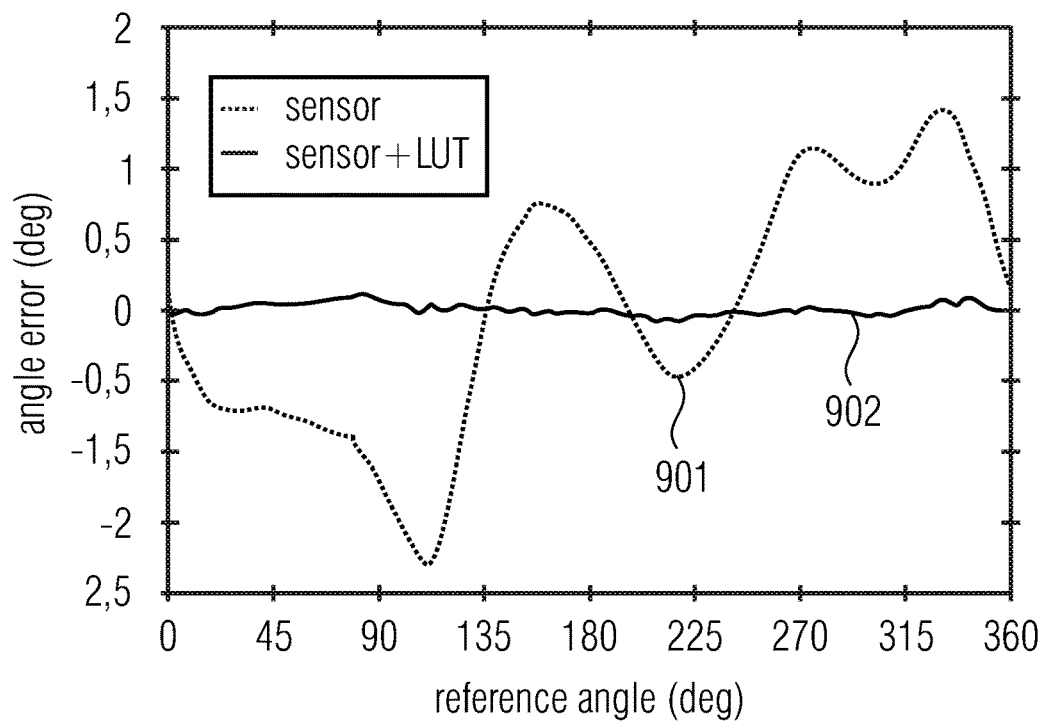

FIGS. 9A and 9B depict the simulation results. In FIG. 9A, the calculated optimum look-up table 301 (solid line) after the LUT autocalibration was compared with the transfer function 207 (dashed line) of the angle sensor 201. The calculated optimum look-up table 301 was used for correction or compensation of the angle output signal of the angle sensor 201. FIG. 9B shows the corresponding residual angle error 901 (dotted line) without LUT autocalibration and LUT compensation and also the residual angle error 902 (solid line) with the LUT autocalibration 706 and LUT compensation 705 described herein.

Figure 10A:
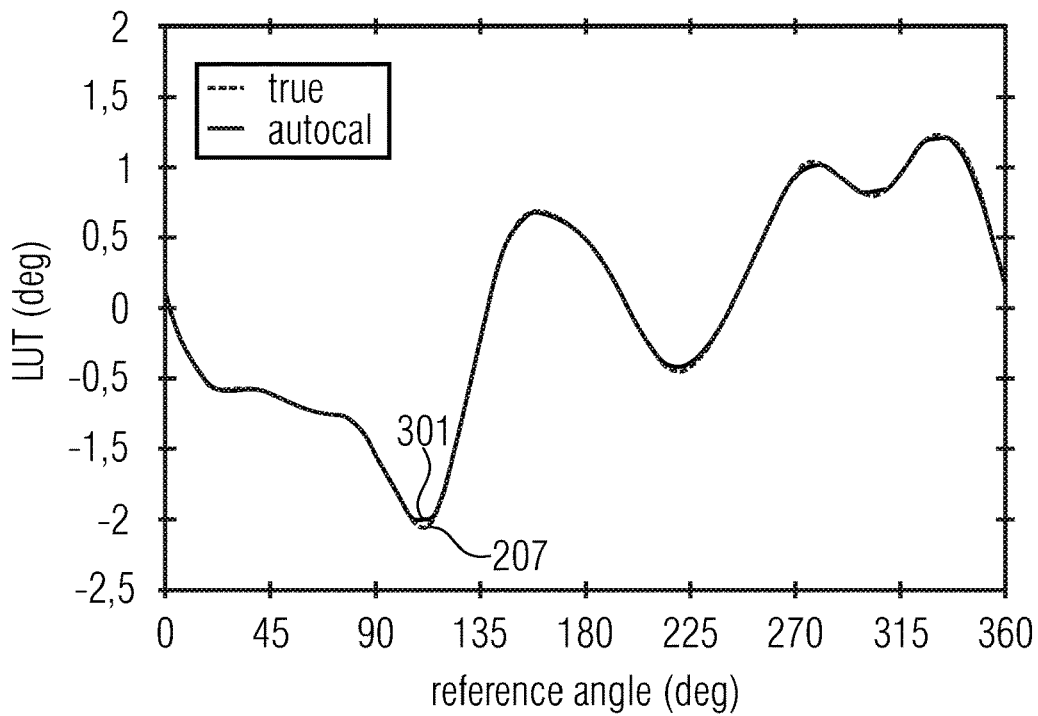
FIGS. 10A, 10B show depictions for elucidating a signal analysis of sensor signals for verifying the concept of iterative LUT autocalibration described herein.
Figure 10B:
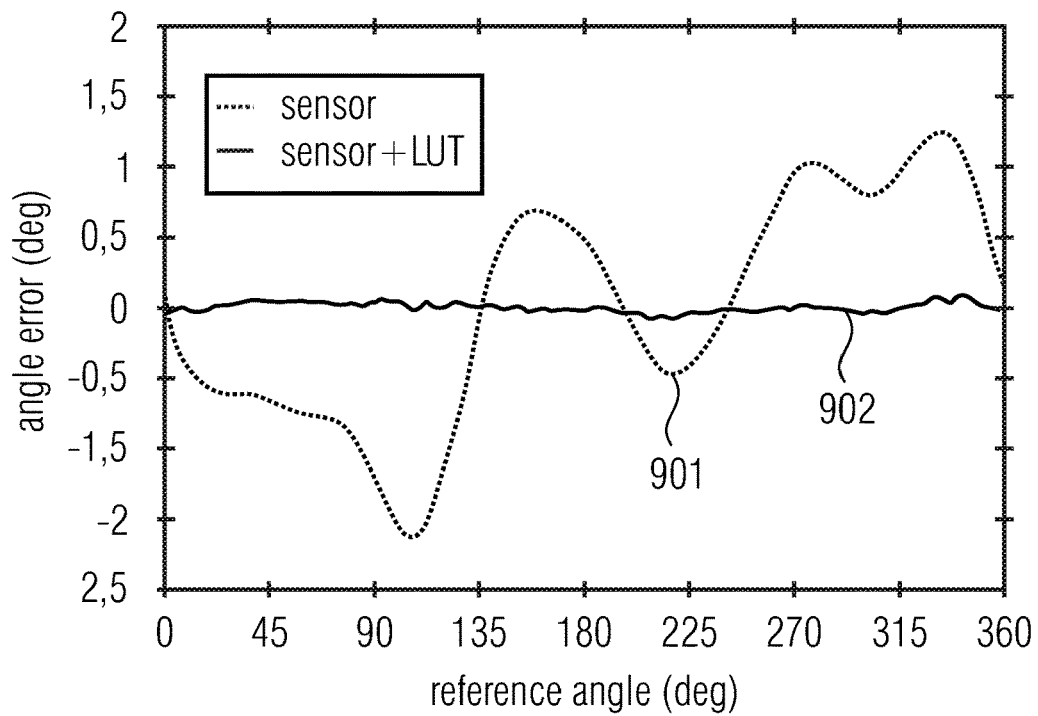

The iterative LUT autocalibration 806 described with reference to FIG. 8B was simulated as well. FIGS. 10A and 10B show the simulation results, wherein it can be discerned that the calculated look-up table 301 in this case corresponds to the transfer function 207 of the angle sensor 201 even more accurately than is the case for a single iteration.

FIG. 10A shows the comparison between the transfer function 207 (dashed line) of the sensor model and the calculated look-up table 301 (solid line) after just two iterations with the iterative LUT autocalibration 806 and LUT compensation 805. FIG. 10B shows the corresponding residual angle error 901 (dotted line) without LUT autocalibration and LUT compensation and the residue angle error 902 (solid line) with the iterative LUT autocalibration 806 and LUT compensation 805 described herein.

In summary, accordingly, given substantially constant angular velocities, it can thus be assumed that an ideal sensor at a constant sampling rate supplies a perfectly linear output signal, e.g. output signals spaced identically with regard to the angle. By contrast, for a real, non-ideal, angle sensor 201, the concept described herein provides for being able to create a look-up table 301 from the ascertained deviation from this property (LUT autocalibration). The look-up table 301 can then be used to correct or compensate for the non-idealities of the angle sensor 201 (LUT compensation).

In the non-limiting further example implementation described below, the non-idealities can even be corrected or compensated for under the assumption of a non-constant angular velocity. A probabilistic approach can be pursued instead. The latter is based on the assumption that each angle input signal or each input angle, e.g. each true rotation angle measured by the angle sensor 201, occurs with the same probability. This assumption should apply to the vast majority of rotating applications, specifically independently of the current angular velocity.

Assuming that all angle input signals 701 occur with the same probability, an ideal sensor would have a uniform probability density distribution in the angle output signals 502 that are output. That is to say that the angle output signals 502, too, should be distributed uniformly just like the angle input signals 701. By contrast, a real, imperfect, angle sensor 201 would have deviations from the ideal sensor transfer function 207, which then in turn influence the resulting probability density of the angle output signals 502.

If the probability density can be determined empirically by considering a sufficiently high number of samples, the real transfer function 207 of the angle sensor 201 can be deduced. The deviations of the real transfer function 207 of the angle sensor 201 then in turn correspond to the sought look-up table 301 or the updated version 403 of the one or more correction values K11, K21, . . . , Kn1 for recalibrating the look-up table 301.

Figure 11:
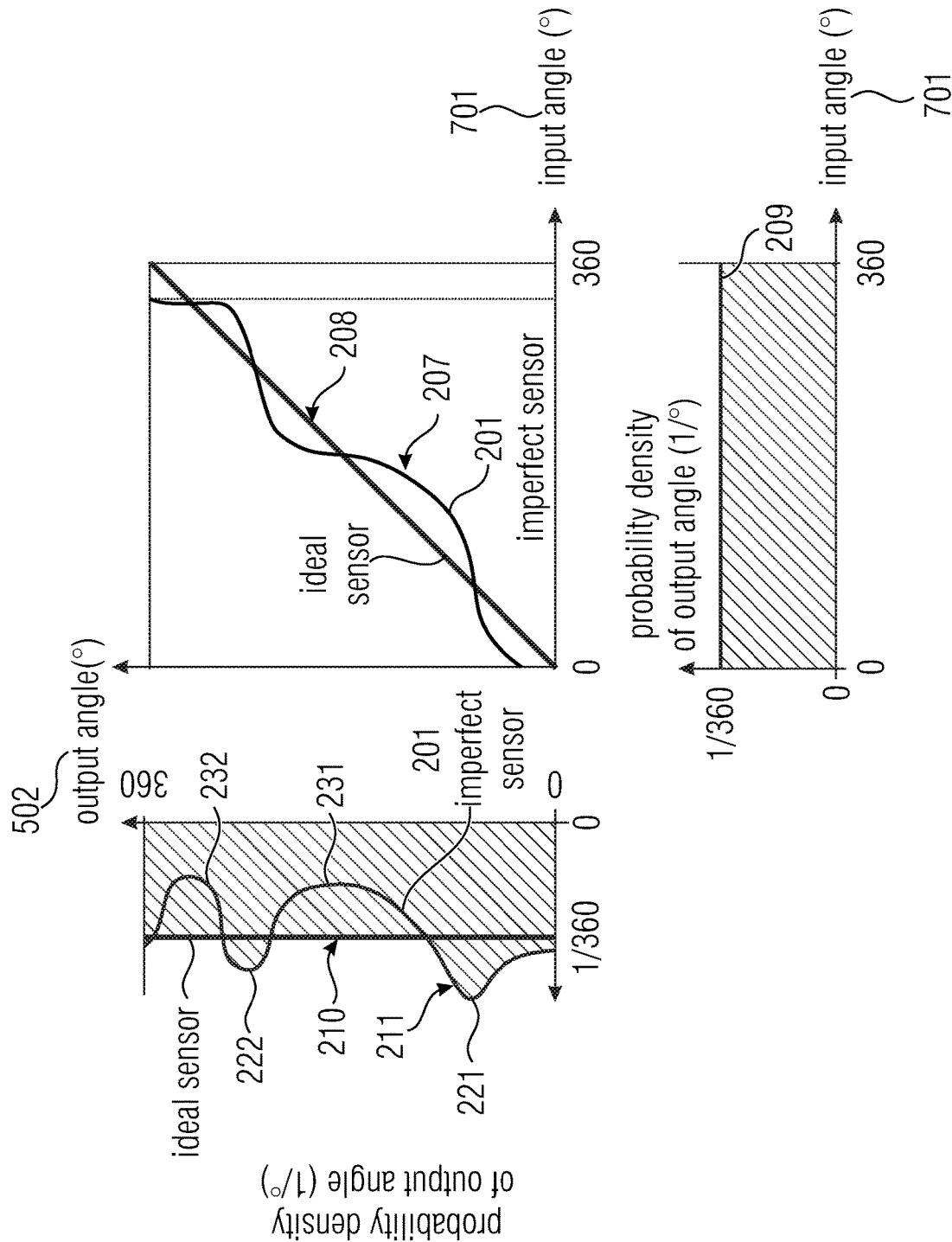
FIG. 11 shows a diagram for illustrating by way of example a probability density of angle output signals of an angle sensor in comparison with an ideal sensor and the transfer function of the angle sensor that is derivable therefrom.

FIG. 11 schematically shows such a probabilistic approach for determining the transfer function 207 of an angle sensor 201 on the basis of the probability density distribution of angle input signals 701 and the corresponding angle output signals 502.

The probability density distribution 209 of angle input signals 701 is depicted in FIG. 11, bottom. It is assumed that over a complete rotation of 360°, all the angle input signals 701 occur with the same probability density, e.g. with ⅟₃₆₀°.

The transfer function 208 of an ideal sensor and the transfer function 207 of a real, non-ideal, angle sensor 201 are depicted in FIG. 11, middle. The transfer function 208 of the ideal sensor has a gradient of 1, e.g. the angle output signals 502 of the ideal sensor, just like the angle input signals 701, occur with the same probability. By contrast, the transfer function 207 of the real, non-ideal, angle sensor 201 deviates from this ideal sensor transfer function 208.

The probability density distribution 210 of the angle output signals 502 of the ideal sensor and the probability density distribution 211 of the angle output signals 502 of the real, non-ideal, angle sensor 201 are depicted in FIG. 11, on the left.

As mentioned in the introduction, the transfer function 207 of the real, non-ideal, angle sensor 201 is initially not known and is therefore intended to be ascertained by way of the concept described herein, on the basis of the probabilistic approach. By carrying out a multiplicity of measurements, a corresponding multiplicity of angle output signals 502 (samples) are obtained. On account of the abovementioned non-idealities of the angle sensor 201, some angle output signals 502 occur more frequently than others.

This can be seen in FIG. 11, on the left. For example, there is a first maximum 221 at approximately 80°, and a second maximum 222 at approximately 290°. That is to say that the angle sensor 201 has a variation in the measurement in this range and allocates a value in the region of the respective maximum 221, 222 to a plurality of values or angle input signals 701. By way of example, on account of non-idealities, the angle sensor 201 can interpret values in the range of 80°±5° as 80°, such that the corresponding angle output signal for 80° occurs with a higher probability in comparison with other angle output signals, for which reason the probability density distribution forms the first maximum 221 in the region of 80°. The same applies to the second maximum 222 in the region of 290°.

Accordingly, the transfer function 207 of the angle sensor 201 can be deduced on the basis of this probability density distribution 211 of the angle output signals 502. The transfer function 207 (FIG. 11, middle) of the angle sensor 201 has a comparatively shallow gradient in the region of the maximum 221, 222, e.g. the gradient of the transfer function 207 is less than 1 at this point and thus shallower than in the case of the transfer function 208 of the ideal sensor. A plurality of input angles (FIG. 11, bottom) are thus mapped onto the same angle output signal (FIG. 11, on the left), with the result that the respective maximum 221, 222 in the probability density distribution 211 is established there.

Exactly the opposite situation prevails in the case of the first and second minima 231, 232-depicted purely by way of example—in the probability density distribution 211 of the angle output signals (FIG. 11, on the left). In this non-limiting example, the two minima 231, 232 occur at approximately 200° and at approximately 320°. By way of example, on account of non-idealities, the angle sensor 201 exhibits the corresponding values at approximately 200° and at approximately 320° less frequently than other values. By way of example, the actual input angle of 200° can frequently be interpreted by the angle sensor 201 as a value deviating from 200° (e.g. 198°, 199°, 201°, 202°, . . . ) with the result that the actual angle output signal is reproduced exactly with 200° only infrequently or with a low probability.

In the region of the minima 231, 232, the transfer function 207 (FIG. 11, middle) of the angle sensor 201 thus has a comparatively large gradient, e.g. the gradient of the transfer function 207 is greater than 1 at this point and thus steeper than in the case of the transfer function 208 of the ideal sensor. An angle input signal (FIG. 11, bottom) is thus mapped onto different angle output signals (FIG. 11, on the left), with the result that the respective minima 231, 232 in the probability density distribution 211 is established there.

In summary, it can thus be stated that a multiplicity of angle output signals are acquired, the probability density 211 of which can be determined. In the probability density 211 ascertained, deviations from the ideal characteristic curve for the angle output signals arise, depending on the behavior of the angle sensor 201. The gradient of the transfer function 207 of the angle sensor 201 can be ascertained on the basis of this. This transfer function 207 ascertained in this way represents the non-idealities of the real, non-ideal, angle sensor 201 and thus corresponds to the desired look-up table 301 or the updated version 403 of the one or more correction values K11, K21, . . . , Kn1.

In accordance with one such implementation, the method disclosed herein according to the probabilistic approach can thus comprise a step of determining a probability density 211 of a plurality of angle output signals 502. In this case, determining the probability density 211 is based on a multiplicity of angle output signals 502 from the received sequence 205 of angle output signals 502 and/or on a multiplicity of further angle output signals from one or more further sequences of angle output signals. The updated version 403 of the one or more correction values K11, K21, ..., Kn1 can then be determined on the basis of the probability density 211.

The deviations of the transfer function 207 of the real, non-ideal, angle sensor 201 from the optimum transfer function 208 (gradient y=1) of an ideal sensor can be determined for example by forming the difference between the respective probability densities 210, 211. That is to say that the difference between the ascertained or determined probability density 211 (FIG. 11, on the left) of the real, non-ideal, angle sensor 201 and the assumed uniformly distributed probability density 210 of an ideal sensor represents the irregularities in the transfer function 207 of the angle sensor 201 (FIG. 11, middle), as a result of which the updated version 403 of the one or more correction values K11, K21, ..., Kn1 can in turn be determined.

In accordance with one such implementation, therefore, the updated version 403 of the one or more correction values K11, K21, ..., Kn1 can be determined on the basis of a difference between the determined probability density 211 and an assumed uniformly distributed probability density 210 of angle output signals.

In this case, the assumed uniformly distributed probability density 211 is based on the assumption that each measured angle (input angle or angle input signals 701) during an actual rotation between the angle sensor 201 and the rotating magnetic field 202 occurs statistically with the same probability.

A brief mathematic treatment concerning the example implementation described with reference to FIG. 11 for LUT autocalibration on the basis of the probabilistic approach shall follow. In this case, true values are designated by the circumflex ^. Firstly a number $N_{Samples}$ of arbitrarily spaced angle output signals are detected. The angle output signals are designated by $\alpha_m$, with a sample index m of from 1 to $N_{Samples}$. The corresponding true rotation angles are then designated by $\hat{\alpha}_m$.

As mentioned in the introduction, it is assumed that the true rotation angles are distributed uniformly in accordance with $p(\hat{\alpha})=1/360°$.

The true look-up table 301, which, as mentioned in the introduction, corresponds to the deviations of the transfer function 207 of the angle sensor 201 from the ideal transfer function 208, is defined as $LUT(\alpha)=\alpha-\hat{\alpha}(\alpha)$. This corresponds (for a certain angle output signal $\alpha$ and apart from signal noise) to the difference between the angle output signal and the true rotation angle. Since the look-up table 301 should describe only the anharmonic errors, it can be assumed that the mean thereof vanishes over 360°, e.g.

$$\frac{1}{360°}\int_0^{360°} LUT(\alpha)\, d\alpha = 0. \tag{14}$$

In reality, the look-up table 301 will normally have a finite number of support points, designated by $N_{LUT}$. Nevertheless, first of all the mathematical concept for continuous variables shall be described.

The conservation of probabilities p(x) dx=p(y) dy makes it possible to calculate the probability density function for the angle output signals, in accordance with $$p(\alpha) = p(\hat{\alpha})\frac{d\hat{\alpha}}{d\alpha} = \frac{1}{360°} \cdot \frac{d\hat{\alpha}}{d\alpha}. \tag{15}$$

Integrating this equation yields the cumulative distribution function $$F(\alpha) = \int_0^\alpha p(\alpha)\, d\alpha + C_1 = \tag{16}$$

$$\int_0^\alpha \frac{1}{360°} \cdot \frac{d\hat{\alpha}}{d\alpha} d\alpha + C_1 = \frac{\hat{\alpha}(\alpha) - \hat{\alpha}(0)}{360°} + C_1 = \frac{\hat{\alpha}(\alpha)}{360°} + C_2,$$

with the integration constant $C_n$. When solved in terms of $\hat{\alpha}$ and using the defining equation for the look-up table, this yields, apart from the integration constant $$lut(\alpha):=LUT(\alpha)+C_3=\alpha-\hat{\alpha}(\alpha)+C_3=\alpha-360°\cdot\int_0^\alpha p(\alpha)d\alpha. \tag{17}$$

Using equation (1), the integration constant results as $$C_3 = \frac{1}{360°}\int_0^{360°} lut(\alpha)\, d\alpha. \tag{18}$$

Subtracting this constant from equation (4) ultimately yields $$LUT(\alpha)=lut(\alpha)-C_3. \tag{19}$$

Equations (4) to (6) show how the optimum look-up table 301, or the updated version 403 of the one or more correction values K11, K21, ..., Kn1, can be calculated on the basis of the probability density function of the angle output signals. The equations above should then also be limited to a finite number $N_{LUT}$ of support points for the look-up table 301 in order to make the method numerically implementable.

For a sufficiently high number of samples over a sufficiently high number (preferably an integer multiple) of revolutions, the respective samples $\alpha_m$ of the angle output signals of the angle sensor 201 are taken into consideration. The number of samples $n_i$ taken into consideration can be accumulated for example using weighted binning for each look-up table bin $i \in \{1 \ldots N_{LUT}\}$. The summation of all $n_i$ accordingly yields the total number of samples in accordance with $$N_{samples} = \sum_{i=1}^{N_{LUT}} n_i, \tag{20}$$

and a suitable normalization yields the empirical probability of finding a sample in the corresponding look-up table LUT bin i $$P_i = \frac{n_i}{N_{samples}}. \tag{21}$$

The indication "sufficiently high number of samples" and "sufficiently high number of revolutions" relate to these probabilities. They should be high enough such that these probabilities adopt a steady state. For discretized bins, the integrations can be replaced by summations. This would accordingly result in the following for equations (4) to (6):

$$lut_i := lut(\alpha_i) = \alpha_i - 360° \cdot \sum_{j=1}^{i} P_j, \quad (22)$$

$$C_3 = \frac{1}{N_{LUT}} \sum_{i=1}^{N_{LUT}} lut_i, \quad (23)$$

$$LUT_i := LUT(\alpha_i) = lut_i - C_3. \quad (24)$$

Equations (7) to (12) show how the optimum look-up table 301 can be calculated from a finite number of angle output signals of the angle sensor 201. In this case, the angle output signals can be acquired directly in the sensor application.

In the case, too, of the probabilistic approach described here, before the application of the optimum look-up table 301 ascertained, harmonic non-idealities (e.g. constant and/or proportional to the sine or cosine of the angle) can be corrected using a so-called amplitude phase offset (AOP) compensation. For this purpose, it is possible to use autocalibration methods which can optimize the parameters for the compensation during the application. This reduces the undesired effects that harmonic non-idealities, for example caused by temperature or lifetime drift, have on the residual angle error.

Figure 12:
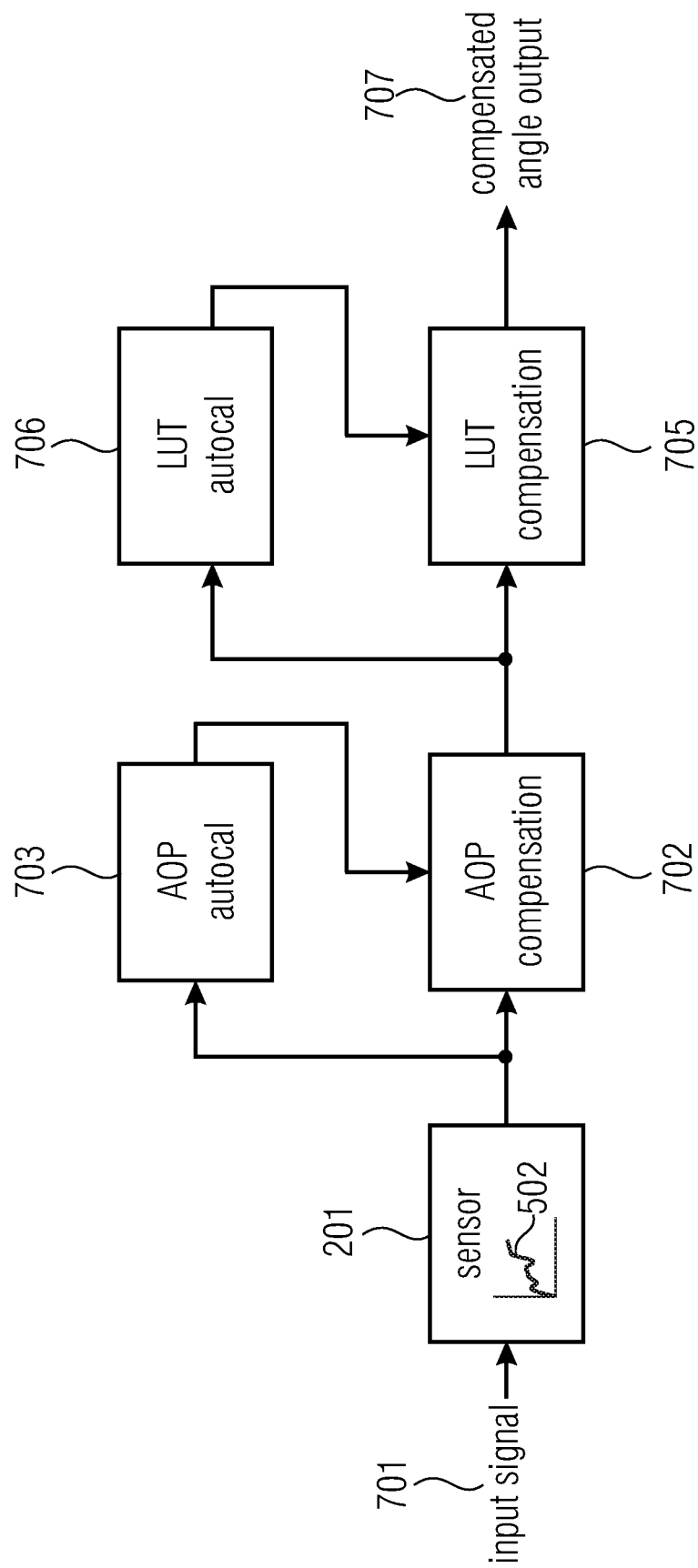
FIG. 12 shows a block diagram for illustrating the application of the concept of LUT autocalibration described herein according to the probabilistic approach in a sensor application in accordance with one example implementation.
Figure 13:
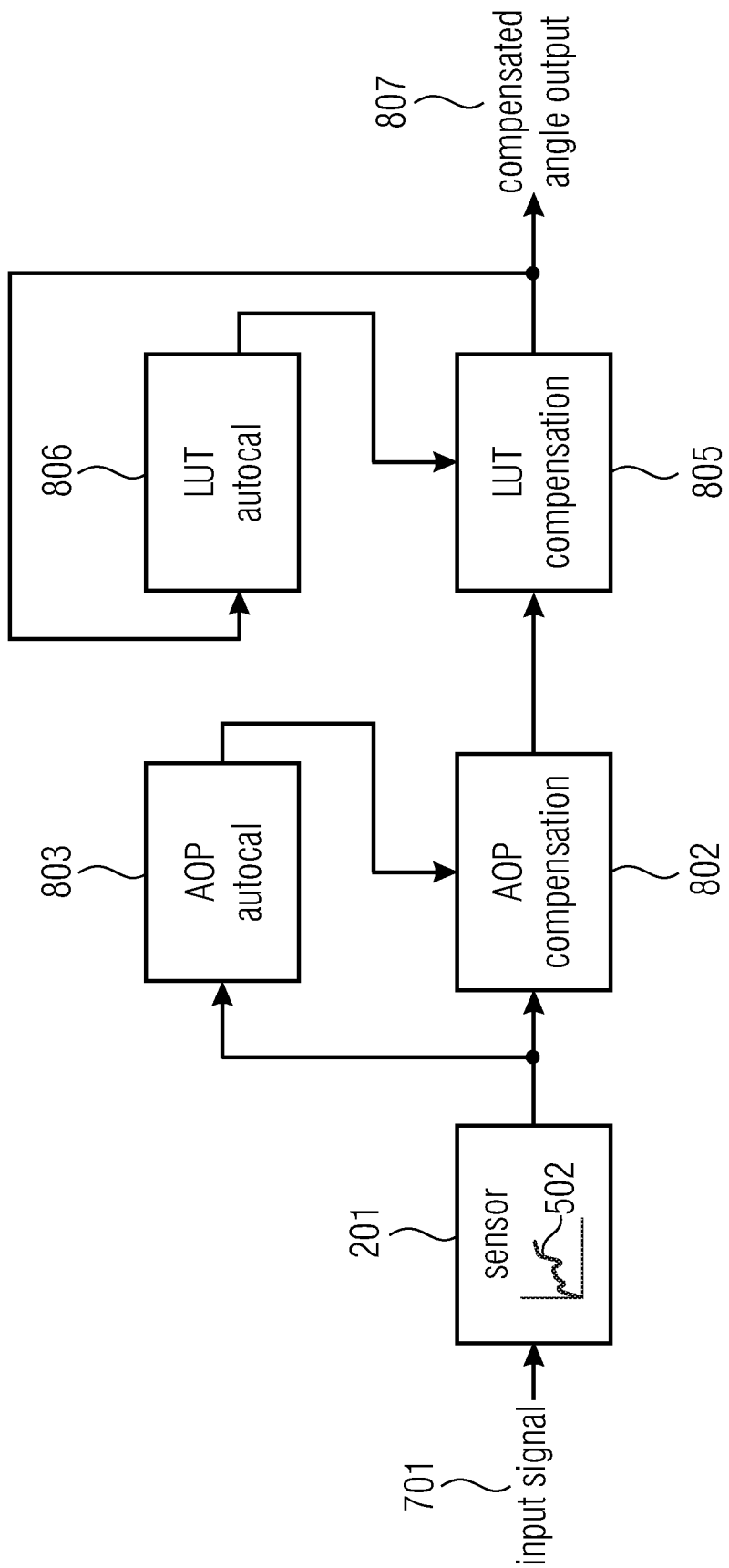
FIG. 13 shows a block diagram for illustrating the application of the concept of iterative LUT autocalibration described herein according to the probabilistic approach in a sensor application in accordance with one example implementation.

FIGS. 12 and 13 show non-limiting examples of the probabilistic concept described herein, similar to FIGS. 7 and 8 discussed above, for which reason blocks having an identical or similar function are identified by the same reference signs.

The angle input signal 701 can firstly be an arbitrary rotation signal. By way of example, a substantially periodic signal can be involved which arises during a rotation at a substantially constant angular velocity. Alternatively, however, the probabilistic approach described here can also involve a non-periodic signal, e.g. independent of a constant angular velocity. The real and generally non-ideal angle sensor 201 translates the angle input signal 701 into an electrical or logical intermediate signal 502 (angle output signal) or into a sequence 205 of intermediate signals.

Afterward, an AOP compensation 702, 802 and optionally an AOP autocalibration 703, 803 can be carried out in order to correct or compensate for the harmonic non-idealities. Both the AOP compensation 702, 802 and the AOP autocalibration 703, 803 are optional, however.

The (optionally AOP-corrected) signal 502 of the angle sensor 201 can then be fed as input to the subsequent LUT compensation 705, 805 and LUT autocalibration 706, 806. The LUT autocalibration 706, 806 can calculate the LUT table 301 or the updated version 403 of the one or more correction values K11, K21, . . . , Kn1 using the multiplicity of angle output signals and the probability density function 211 thereof in accordance with the explanations and equations above.

That is to say that the LUT autocalibration 706, 806 is used in accordance with the explanations above in order to determine the optimum look-up table 301 for the respective angle sensor 201 on the basis of the ascertained probability density function 211 of the multiplicity of angle output signals 502 of the angle sensor 201. The optimum look-up table 301 can then be used in the LUT compensation 705, 805 in order to correct or compensate for the non-idealities of the angle sensor 201 and thus to obtain the best possible corrected or compensated angle output signal 707, 807, which corresponds as well as possible, or in the best case exactly, to the true rotation angle, e.g. the angle input signal 701.

The block diagram depicted by way of example in FIG. 13 differs from the block diagram depicted in FIG. 12 inter alia in that the angle output signal 807 corrected or compensated in the LUT compensation 705, 805 is fed back into the LUT autocalibration 806. The example implementation depicted in FIG. 13 thus involves an iterative LUT autocalibration 806, which can improve the quality of the LUT compensation 805.

That is to say that the LUT autocalibration 806 can be calculated from the already LUT-compensated angle output signal 807 of the angle sensor 201. The result of a single LUT autocalibration is therefore not the look-up table 301 itself, but rather an increment that is added to the existing look-up table 301. It is expedient to initialize the look-up table 301, for which purpose, for example, all the correction values K1, K2, . . . , Kn initially contained in the look-up table 301 are set to zero, which would correspond to an ideal sensor.

Accordingly, the sequence of the iterative LUT autocalibration 806 illustrated in FIG. 13 would thus be summarized as follows:
1. Initialize the look-up table (e.g. by zeroing)
2. Carry out the LUT autocalibration
3. Add the result obtained to the already existing look-up table
4. Continue at step 2.

This sequence can be carried out continuously in the background, for example, in the sensor application.

One possible implementation of the concept described herein in Matlab shall be described below:

```
function LUT = autocalLUTProbabilistic(sampled_angles, N_LUT)
% Autocalibration of the look-up table (LUT) of an angle sensor using the
% probabilistic approach.
%
% Inputs:
% sampled angles ... Sensor's angle output, arbitrarily sampled
% N_LUT      ... Number of grid points of the LUT
    % angular distance between two LUT grid points
    LUT_delta = 360/N_LUT; % [deg]
    % LUT grid points
    LUT_angles = 0:LUT delta:360-LUT_delta; % [deg]
    accum_N = zeros(1,N_LUT);
    for cnt = 1:numel(sampled_angles)
        % Binning with linear weights:
        % The 0.5 centers the final LUT w.r.t. the true one. This is
        % due to the finite (N_LUT) grid point integration.
        float_index = 1 + mod(0.5+sampled_angles(cnt)/LUT_delta,
N_LUT);
        left = floor(float_index);
        weight = float_index - left;
        if left < N_LUT
            right = left+1 ;
        else
            % due to periodicity, the right neighbor of the last LUT grid
            % point is the first grid point
            right = 1;
        end
        accum_N(left) = accum_N(left) + (1-weight);
        accum_N(right) = accum_N(right) + weight;
    end
    % empirical probabilities of finding samples in LUT bins
    emp_prob = accum_N/numel(sampled_angles);
    % LUT including an offset (integration constant)
    LUT_tilde = LUT_angles - 360*cumsum(emp_prob); % [deg]
```

-continued

```
% estimate for the offset (integration constant)
angle_offset = mean(LUT_tilde); % [deg]
% the final estimator for the LUT
LUT = LUT_tilde - angle_offset; % [deg]
end
```

The complete process of the LUT autocalibration 706, 806 and of the LUT compensation 705, 805 using the probabilistic approach described herein was implemented in Matlab and verified therein by the inventors. A sensor model with a randomly chosen transfer function was modeled in this case. A certain number of randomly selected reference angle signals, distributed uniformly between 0° and 360°, were input into the sensor model. The sensor output was input into the function autocalLUT( ), which calculates the optimum look-up table in accordance with the probabilistic approach described herein.

Figure 14A:
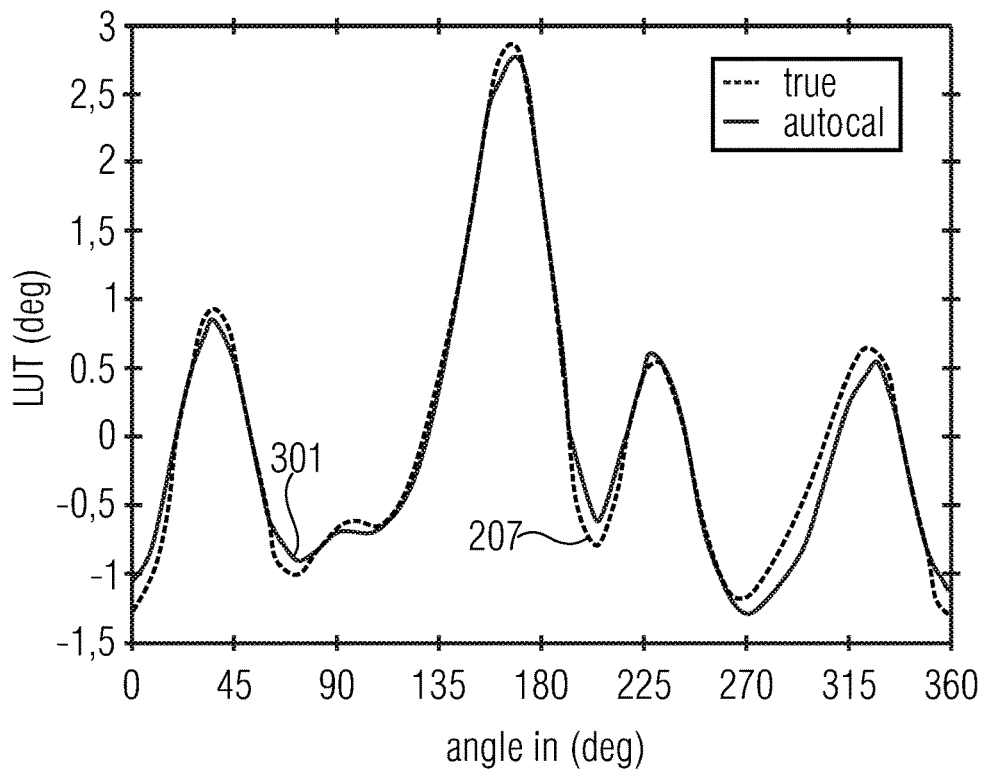
FIGS. 14A, 14B show depictions for elucidating a signal analysis of sensor signals for verifying the concept of LUT autocalibration described herein according to the probabilistic approach.
Figure 14B:
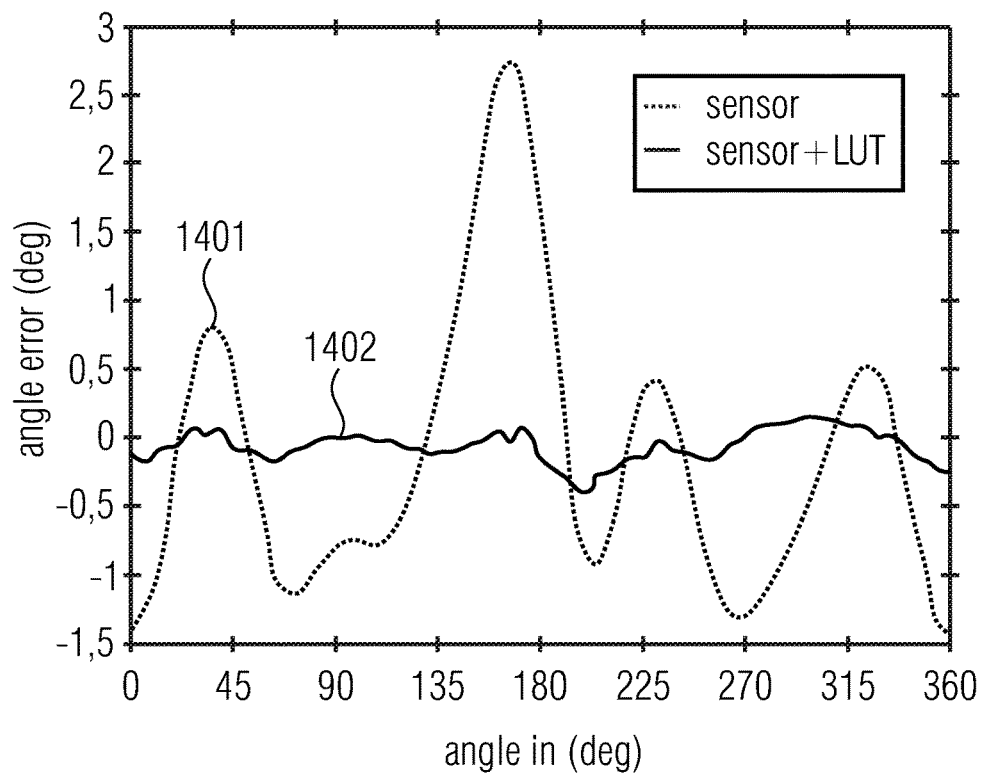

FIGS. 14A and 14B depict the simulation results. In FIG. 14A, the calculated optimum look-up table 301 (solid line) after the LUT autocalibration was compared with the transfer function 207 (dashed line) of the angle sensor 201. The calculated optimum look-up table 301 was used for correction or compensation of the angle output signal of the angle sensor 201. FIG. 14B shows the corresponding residual angle error 1401 (dotted line) without the LUT autocalibration and LUT compensation described herein and also the residual angle error 1402 (solid line) with the LUT autocalibration 706 and LUT compensation 705 described herein according to the probabilistic approach.

Figure 15A:
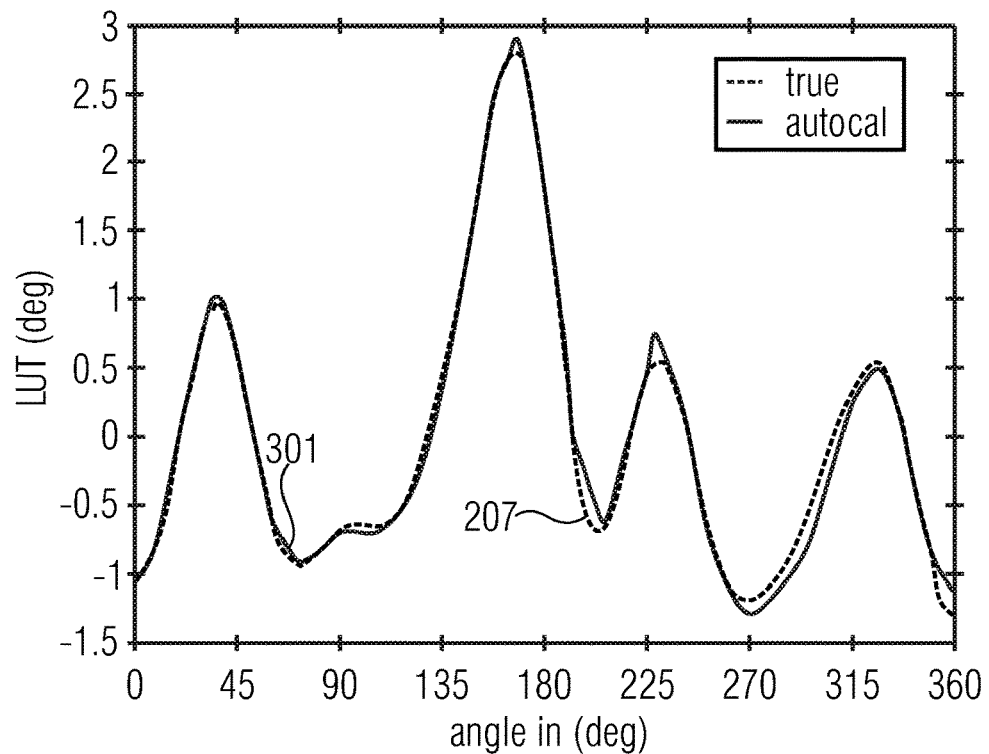
FIGS. 15A, 15B show depictions for elucidating a signal analysis of sensor signals for verifying the concept of iterative LUT autocalibration described herein according to the probabilistic approach.
Figure 15B:
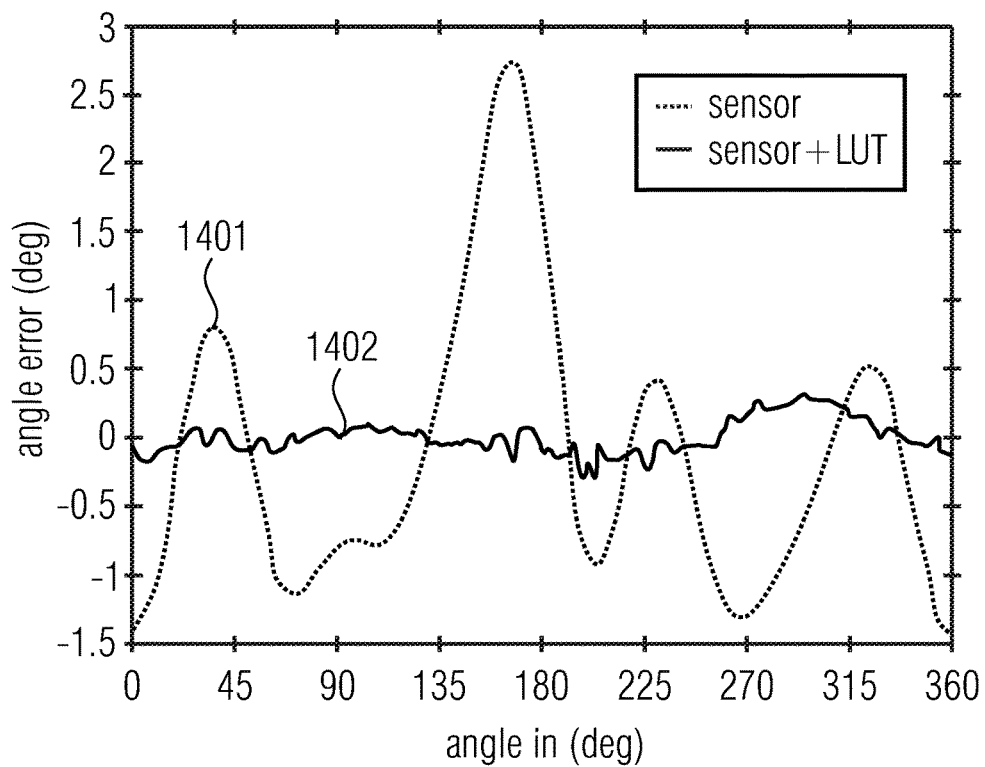

The iterative LUT autocalibration 806 described with reference to FIG. 13B was simulated as well. FIGS. 15A and 15B show the simulation results, wherein it can be discerned that the calculated look-up table 301 in this case corresponds to the transfer function 207 of the angle sensor 201 even more accurately than is the case for a single iteration.

FIG. 15A shows the comparison between the transfer function 207 (dashed line) of the sensor model and the calculated look-up table 301 (solid line) after just two iterations with the iterative LUT autocalibration 806 and LUT compensation 805. FIG. 15B shows the corresponding residual angle error 1401 (dotted line) without the LUT autocalibration 706, 806 and LUT compensation 705, 805 described herein and the residue angle error 1402 (solid line) with the iterative LUT autocalibration 806 and LUT compensation 805 described herein according to the probabilistic approach.

In summary, it can thus be stated that for uniformly distributed angle input signals 701, likewise uniformly distributed angle output signals 502 should be expected from an ideal sensor. For a real, non-ideal angle sensor 201, in accordance with the probabilistic approach described herein, it is possible to determine a look-up table 301 on the basis of an empirical and probabilistic angle distribution within the sensor application, which is also referred to herein as LUT autocalibration 706, 806. The look-up table 301 can then be used to correct or compensate for the non-idealities of the real angle sensor 201.

In other words, this disclosure describes, inter alia, various methods for the autocalibration of lookup-tables 301 for angle sensors 201, and various concepts of sensor systems which are suitable for implementing the methods. By way of example, a sensor drift brought about by anharmonic irregularities can be corrected or compensated for using the LUT autocalibration described herein.

One method describes carrying out the LUT autocalibration 706, 806 on the basis of the finite difference method assuming a substantially constant angular velocity. The computational complexity here is (3 mult+6 add+1 sub)/sample+const. The storage requirement is 2*LUT+a very few scalars.

A further method describes carrying out the LUT autocalibration 706, 806 on the basis of a probabilistic approach based on the assumption that all the angle input signals occur with the same probability, e.g. sufficiently rapidly. The computational complexity here is 2 add/sample+const. The storage usage is 1*LUT+a very few scalars. The probabilistic method therefore uses a lower computational complexity and lower memory usage than the method based on the finite differences.

The example implementations described above merely represent an illustration of the principles described herein. It goes without saying that modifications and variations of the arrangements and details described herein will be apparent to others skilled in the art. Therefore, the intention is for the concept described herein to be restricted by the scope of protection of the following patent claims and not by the specific details that have been presented herein on the basis of the description and the explanation of the example implementations.

Although some aspects have been described in association with a device, it goes without saying that these aspects also constitute a description of the corresponding method, and so a block or a component of a device should also be understood as a corresponding method step or as a feature of a method step. Analogously thereto, aspects that have been described in association with or as a method step also constitute a description of a corresponding block or detail or feature of a corresponding device.

Some or all of the method steps can be carried out by a hardware apparatus (or using a hardware apparatus), such as, for example, a microprocessor, a programmable computer or an electronic circuit. In some example implementations, some or a plurality of the most important method steps can be performed by such an apparatus.

Depending on specific implementation requirements, example implementations of the concept described herein can be implemented using hardware or using software or at least partly using hardware or at least partly using software. The implementation can be carried out using a digital storage medium, for example a floppy disk, a DVD, a BluRay disk, a CD, a ROM, a PROM, an EPROM, an EEPROM or a FLASH memory, a hard disk or some other magnetic or optical storage unit on which are stored electronically readable control signals which can cooperate or cooperate with a programmable computer system in such a way that the respective method is carried out. Therefore, the digital storage medium can be computer-readable.

Some example implementations in accordance with the concept described herein thus comprise a data carrier having electronically readable control signals that are able to cooperate with a programmable computer system in such a way that one of the methods described herein is carried out.

Generally, example implementations of the concept described herein can be implemented as a computer program product comprising a program code, wherein the program code is effective in respect of carrying out one of the methods when the computer program product is executed on a computer.

The program code can for example also be stored on a machine-readable carrier.

Other example implementations comprise the computer program for carrying out one of the methods described herein, wherein the computer program is stored on a machine-readable carrier. In other words, one example implementation of the method described herein is therefore a computer program comprising a program code for carrying out one of the methods described herein when the computer program is executed on a computer.

A further example implementation of the concept described herein is therefore a data carrier (or a digital storage medium or a computer-readable medium) on which the computer program for carrying out one of the methods described herein is recorded. The data carrier or the digital storage medium or the computer-readable medium is typically tangible and/or nonvolatile.

A further example implementation of the concept described herein is therefore a data stream or a sequence of signals that constitutes or constitute the computer program for carrying out one of the methods described herein. The data stream or the sequence of signals can be configured for example to the effect of being transferred via a data communication connection, for example via the Internet.

A further example implementation comprises a processing device, for example a computer or a programmable logic component, which is configured or adapted to the effect of carrying out one of the methods described herein.

A further example implementation comprises a computer on which the computer program for carrying out one of the methods described herein is installed.

A further example implementation comprises a device or a system designed to transmit a computer program for carrying out at least one of the methods described herein to a receiver. The transmission can be effected electronically or optically, for example. The receiver can be for example a computer, a mobile device, a storage device or a similar device. The device or the system can comprise for example a file server for transmitting the computer program to the receiver.

In some example implementations, a programmable logic component (for example a field programmable gate array, an FPGA) can be used to carry out some or all functionalities of the methods described herein. In some example implementations, a field programmable gate array can cooperate with a microprocessor in order to carry out one of the methods described herein. Generally, the methods in some example implementations are carried out on the part of an arbitrary hardware device. The latter can be universally usable hardware such as a computer processor (CPU) or hardware specific to the method, such as an ASIC, for example.

The invention claimed is:

1. A method for determining a transfer function of an angle sensor, wherein the method comprises:
    generating, by the angle sensor, a sequence of angle output signals during an exposure to a rotating magnetic field;
    receiving the sequence of angle output signals of the angle sensor during at least one time interval during which the angle sensor is exposed to the rotating magnetic field;
    determining the transfer function of the angle sensor based on the sequence of angle output signals;
    configuring the angle sensor based on the transfer function such that an angle output signal generated by the angle sensor is representative of an actual angle value;
    acquiring one or more correction values from a look-up table;
    using the one or more correction values to at least one of correct irregularities of the transfer function or to linearize the transfer function;
    recalibrating the look-up table with an updated version of the one or more correction values, wherein the updated version of the one or more correction values is determined based on the sequence of angle output signals;
    using the updated version of the one or more correction values to at least one of correct irregularities of the transfer function or to linearize the transfer function; and
    generating, by the angle sensor, a corrected angle output signal based on the transfer function corresponding to the updated version of the one or more correction values.

2. The method as claimed in claim 1,
    wherein the transfer function is determined independently of a reference angle signal describing a base angle.

3. The method as claimed in claim 1,
    wherein the method is carried out at least once or continuously during operation of the angle sensor at a target location thereof.

4. The method as claimed in claim 1,
    wherein the look-up table is recalibrated repeatedly by the look-up table being filled with a respectively updated version of the one or more correction values, and
    wherein the respective updated version of the one or more correction values is determined based on the sequence of angle output signals.

5. The method as claimed in claim 1,
    wherein the at least one time interval in which the sequence of angle output signals is received includes a time interval during which an angular velocity of a rotation between the rotating magnetic field and the angle sensor is substantially constant, and
    wherein the updated version of the one or more correction values is determined based on an angular velocity signal which is determinable from the sequence of angle output signals.

6. The method as claimed in claim 5,
    wherein the updated version of the one or more correction values is determined based on a difference between the angular velocity signal and a mean value of the angular velocity signal.

7. The method as claimed in claim 1, further comprising:
    determining a probability density of a plurality of angle output signals,
    wherein determining the probability density is based on at least one of a multiplicity of angle output signals from the received sequence of angle output signals or a multiplicity of further angle output signals from one or more further sequences of angle output signals, and
    wherein the updated version of the one or more correction values is determined based on the probability density.

8. The method as claimed in claim 7,
    wherein the updated version of the one or more correction values is determined based on a difference between the probability density and an assumed uniformly distributed probability density of angle output signals.

9. The method as claimed in claim 8,
    wherein the assumed uniformly distributed probability density of angle output signals is based on an assumption that each measured angle of an actual rotation between the angle sensor and the rotating magnetic field occurs statistically with a same probability.

10. The method as claimed in claim 1,
wherein the updated version of the one or more correction values corresponds to irregularities of the transfer function of the angle sensor vis-à-vis a linearized transfer function.

11. The method as claimed in claim 1, further comprising applying an amplitude offset phase correction (AOP) to the sequence of angle output signals,
wherein at least one of an amplitude difference, an offset, or a phase difference between a first signal component and a second signal component of an angle output signal is corrected in order to obtain a corresponding amplitude-offset-phase-corrected sequence of angle output signals, and
wherein the method includes using the amplitude-offset-phase-corrected sequence of angle output signals as the sequence of angle output signals.

12. A non-transitory computer-readable medium comprising a computer program comprising a program code for causing a programmable hardware device to execute the method as claimed in claim 11.

13. The method as claimed in claim 1, further comprising:
updating the one or more correction values to one or more updated correction values based on the sequence of angle output signals,
wherein determining the transfer function includes calibrating the transfer function based on the one or more updated correction values.

14. The method as claimed in claim 1, wherein each angle output signal of the sequence of angle output signals is representative of a different 360-degree rotation of the rotating magnetic field.

15. A device for determining a transfer function of an angle sensor, the device comprising:
a signal processing device comprising at least one signal processor, wherein the signal processing device configured to:
store one or more correction values in a look-up table,
correct irregularities of the transfer function or to linearize the transfer function using the one or more correction values,
receive a sequence of angle output signals from the angle sensor during at least one time interval during which the angle sensor is exposed to a rotating magnetic field,
during operation of the angle sensor, determine the transfer function of the angle sensor based on the sequence of angle output signals,
update the one or more correction values to one or more updated correction values based on the sequence of angle output signals,
correct irregularities of the transfer function or to linearize the transfer function using the one or more updated correction values, and
reconfigure the angle sensor based on the transfer function such that an angle output signal generated by the angle sensor is representative of an actual angle value.

16. A method for determining a transfer function of an angle sensor, wherein the method comprises:
generating, by the angle sensor, a sequence of angle output signals during an exposure to a rotating magnetic field;
receiving the sequence of angle output signals of the angle sensor during at least one time interval during which the angle sensor is exposed to the rotating magnetic field;
determining the transfer function of the angle sensor based on the sequence of angle output signals;
configuring the angle sensor based on the transfer function such that an angle output signal generated by the angle sensor is representative of an actual angle value;
storing one or more correction values in a look-up table; and
updating the one or more correction values in the look-up table with one or more updated correction values based on the sequence of angle output signals;
wherein determining the transfer function includes calibrating the transfer function based on the one or more updated correction values, and
wherein the one or more updated correction values are used to at least one of correct irregularities of the transfer function or to linearize the transfer function.

* * * * *